(12) United States Patent
Sasaki et al.

(10) Patent No.: US 8,938,133 B2
(45) Date of Patent: Jan. 20, 2015

(54) IMAGE RESIZING APPARATUS AND METHOD THAT INTERPOLATES IMAGE BLOCKS WITH ABUTTAL REGIONS

(75) Inventors: Gen Sasaki, Osaka (JP); Yusuke Mizuno, Osaka (JP); Katsuya Hashimoto, Osaka (JP); Yuki Haraguchi, Osaka (JP)

(73) Assignee: MegaChips Corporation, Osaka-shi (JP)

(*) Notice: Subject to any disclaimer, the term of this patent is extended or adjusted under 35 U.S.C. 154(b) by 149 days.

(21) Appl. No.: 13/269,745

(22) Filed: Oct. 10, 2011

(65) Prior Publication Data

US 2012/0093410 A1 Apr. 19, 2012

(30) Foreign Application Priority Data

Oct. 18, 2010 (JP) .................. 2010-233277

(51) Int. Cl.
  *G06K 9/32* (2006.01)
  *G06T 1/60* (2006.01)
  *G06T 3/40* (2006.01)
(52) U.S. Cl.
  CPC ................ *G06T 1/60* (2013.01); *G06T 3/4007* (2013.01)
  USPC .......................................... 382/298; 345/669
(58) Field of Classification Search
  CPC ..................................................... H04N 1/393
  See application file for complete search history.

(56) References Cited

U.S. PATENT DOCUMENTS

| 5,586,196 A | 12/1996 | Sussman |
| 5,850,487 A * | 12/1998 | Takane et al. ................. 382/298 |
| 5,977,947 A * | 11/1999 | Potu ............................. 345/660 |
| 6,348,925 B1 * | 2/2002 | Potu ............................. 345/537 |
| 6,388,711 B1 | 5/2002 | Han et al. |
| 2001/0005429 A1 * | 6/2001 | Ishiga et al. .................. 382/167 |
| 2003/0048951 A1 * | 3/2003 | Rengakuji et al. ............. 382/232 |

(Continued)

FOREIGN PATENT DOCUMENTS

| EP | 1 420 362 A2 | 5/2004 |
| EP | 1 765 000 A2 | 3/2007 |

(Continued)

OTHER PUBLICATIONS

Japanese Office Action issued Feb. 25, 2014 in Patent Application No. 2010-233277 with English Translation.

(Continued)

*Primary Examiner* — Bhavesh Mehta
*Assistant Examiner* — Andrew Moyer
(74) *Attorney, Agent, or Firm* — Oblon, Spivak, McClelland, Maier & Neustadt, L.L.P.

(57) ABSTRACT

An image processing apparatus includes a first storage section and a second storage section, a storage control section, and a computation section. The storage control section sequentially acquires block images obtained as a result of dividing an input image, and stores the block image as a target block image in the first storage section, while storing, in the second storage section, image data of, in a region of the target block image, a region abutting un-inputted block images in the input image, as image data of an abuttal region. The computation section implements a resizing process for changing the size of the target block image by performing an interpolation calculation using image data of the target block image stored in the first storage section and the image data of the abuttal region stored in the second storage section.

11 Claims, 35 Drawing Sheets

(56) References Cited

U.S. PATENT DOCUMENTS

| | | | |
|---|---|---|---|
| 2004/0213467 A1* | 10/2004 | Tanaka et al. | 382/233 |
| 2005/0122347 A1 | 6/2005 | Buerkle et al. | |
| 2005/0140796 A1* | 6/2005 | Okabe | 348/231.99 |
| 2005/0213830 A1* | 9/2005 | Nagashima | 382/239 |
| 2007/0047828 A1* | 3/2007 | Ishii et al. | 382/232 |
| 2008/0211825 A1* | 9/2008 | Sunakawa et al. | 345/581 |
| 2008/0297859 A1* | 12/2008 | Iwatsuka | 358/500 |
| 2009/0232212 A1* | 9/2009 | Amon | 375/240.15 |
| 2011/0122298 A1 | 5/2011 | Takahashi et al. | |
| 2011/0129164 A1* | 6/2011 | Lin et al. | 382/254 |

FOREIGN PATENT DOCUMENTS

| | | |
|---|---|---|
| JP | 10-178542 A | 6/1998 |
| JP | 11-283023 | 10/1999 |

OTHER PUBLICATIONS

Extended European Search Report issued on Jul. 22, 2014 in European Patent Application No. 11185229.9.

* cited by examiner

F I G . 1
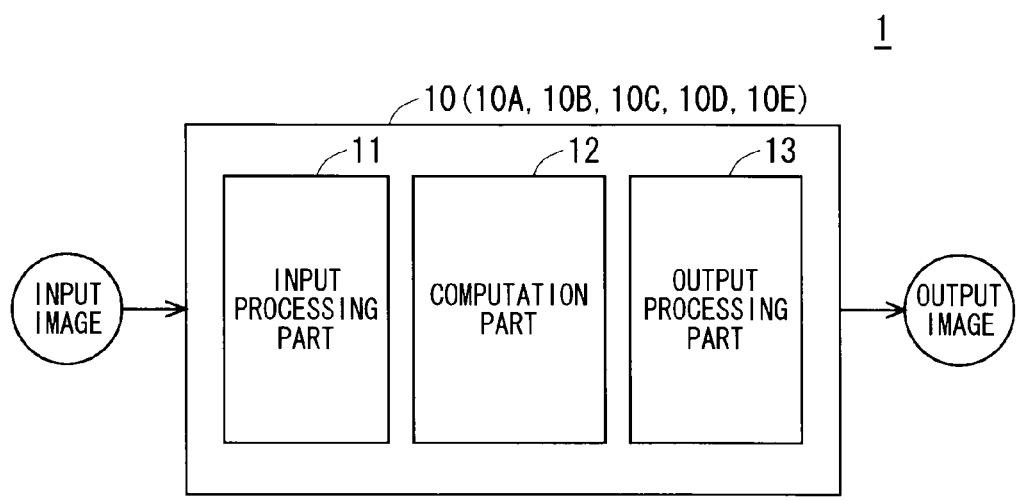

F I G . 3
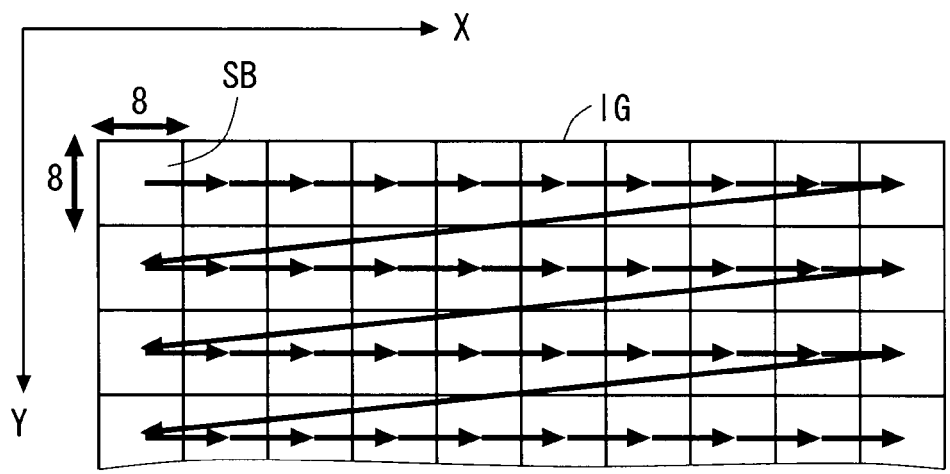

F I G . 5
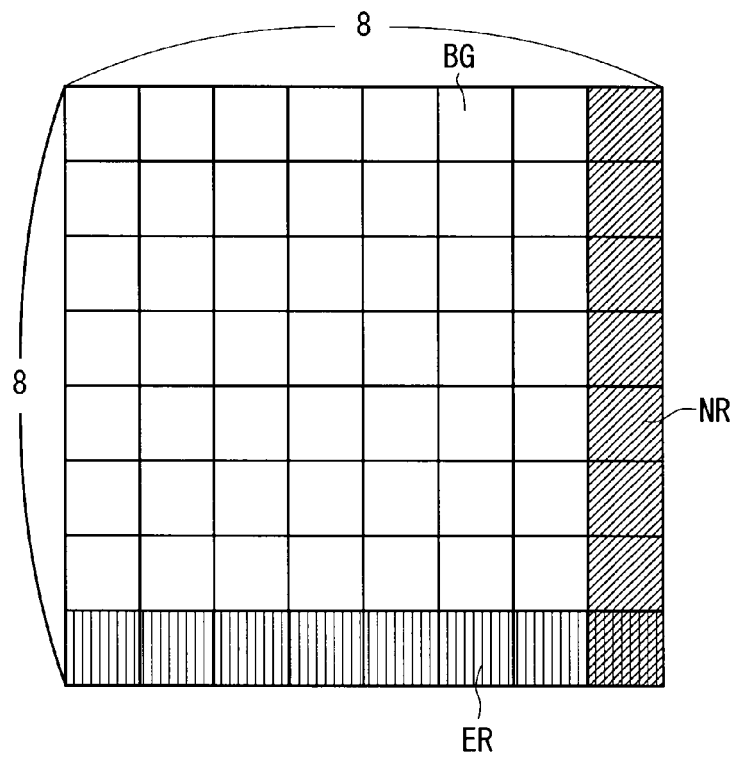
F I G . 6
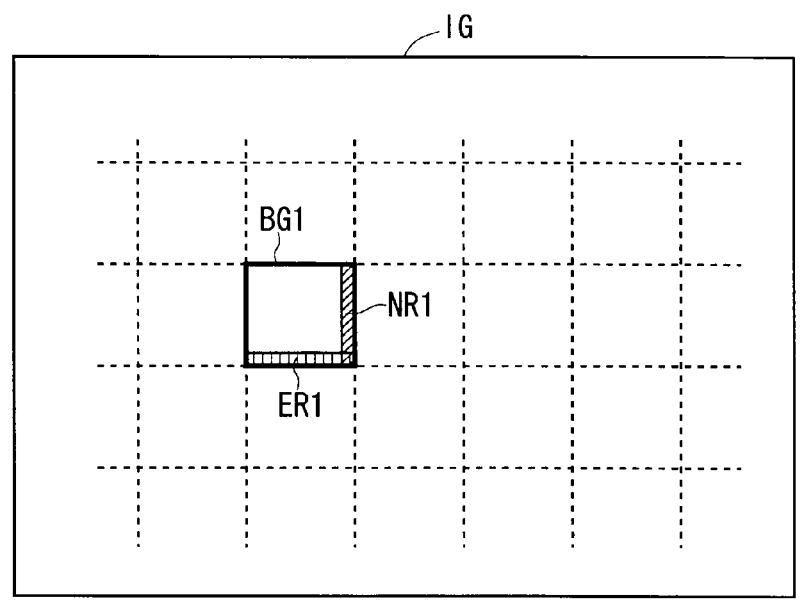

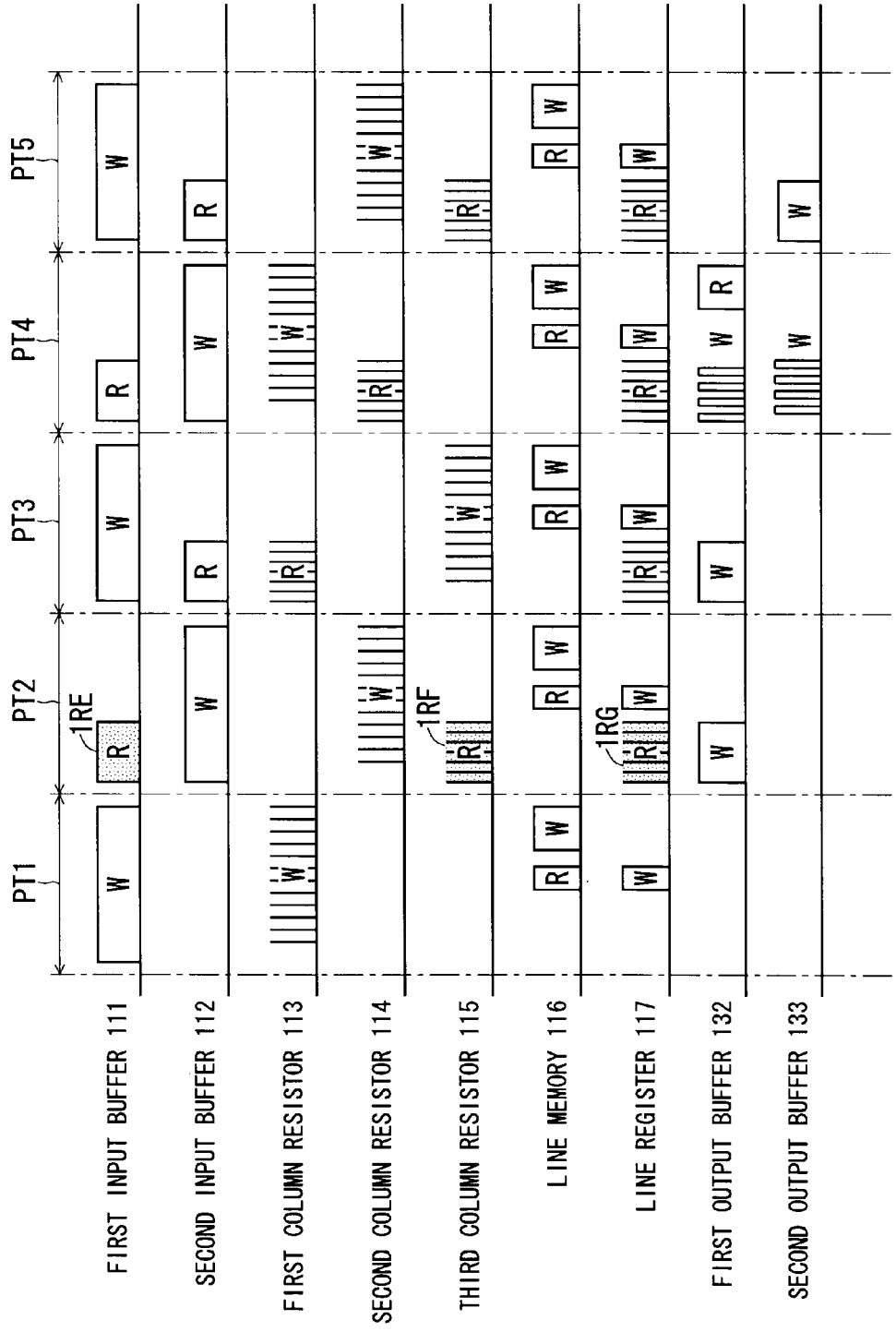

F I G . 1 2
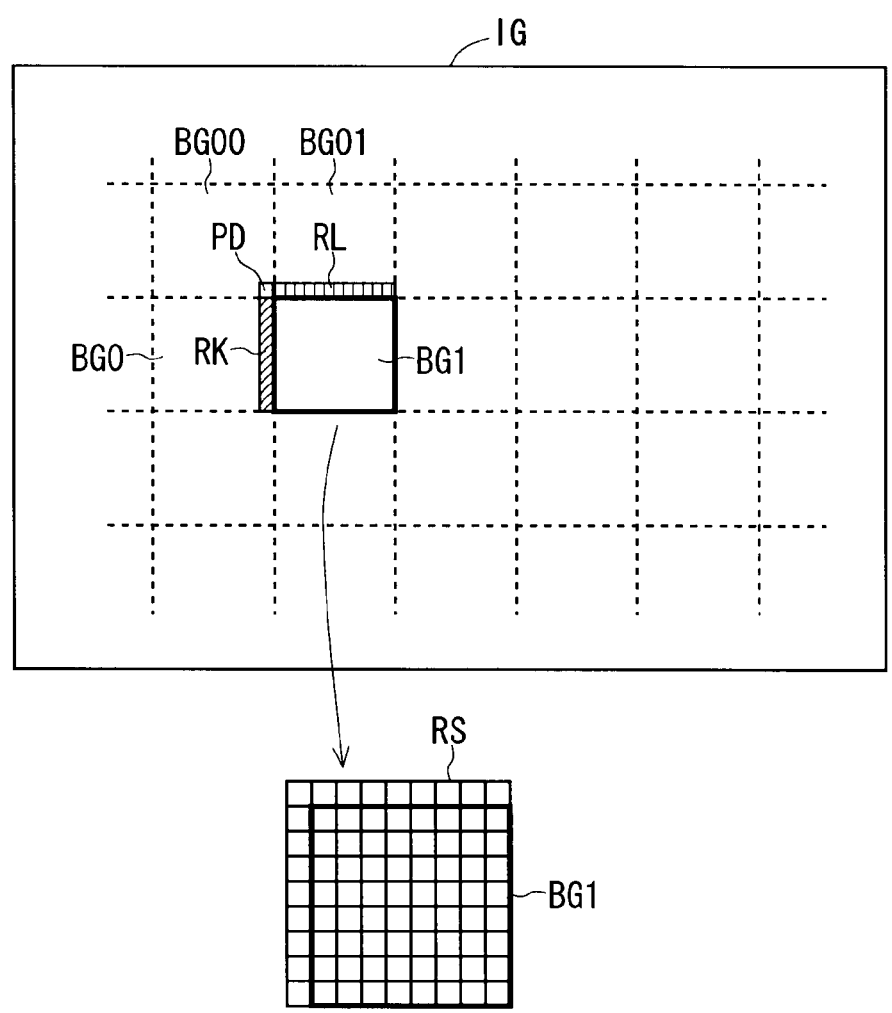

F I G . 1 6
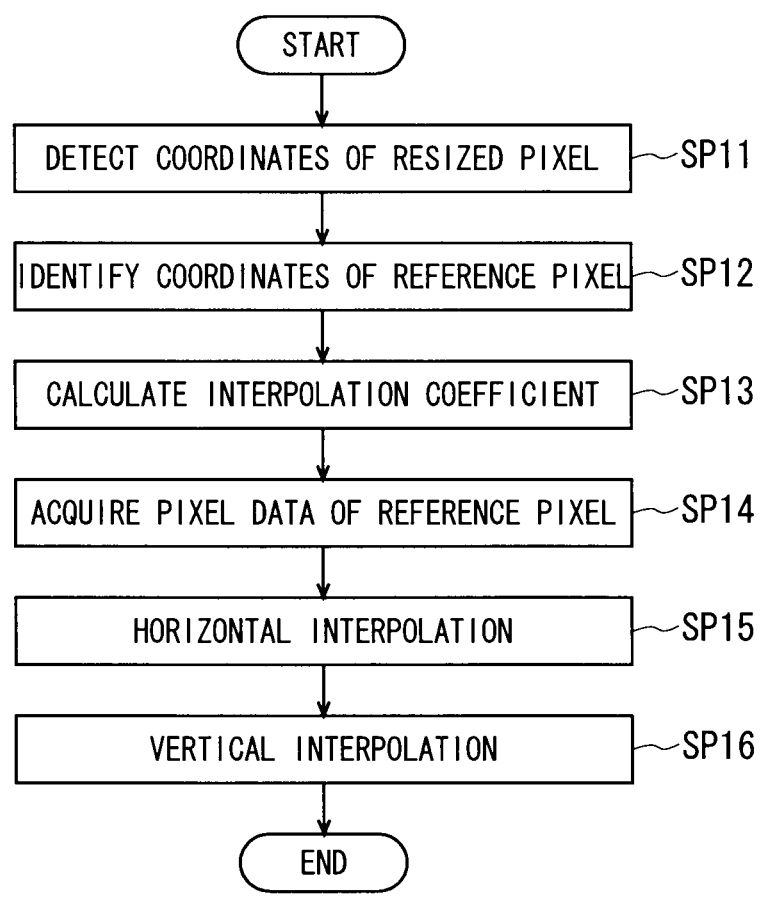

F I G . 1 9
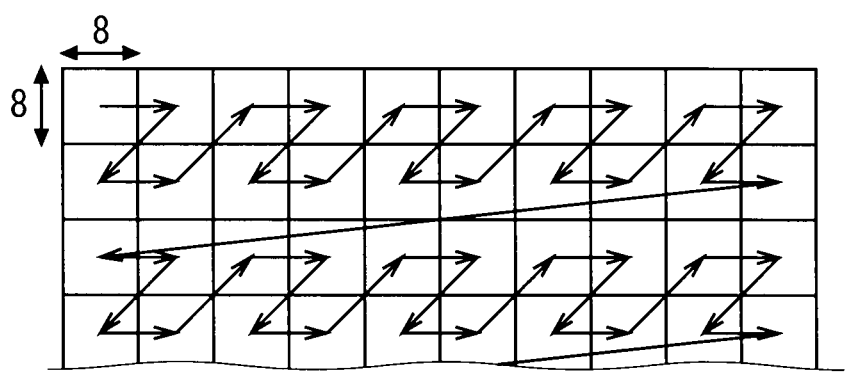

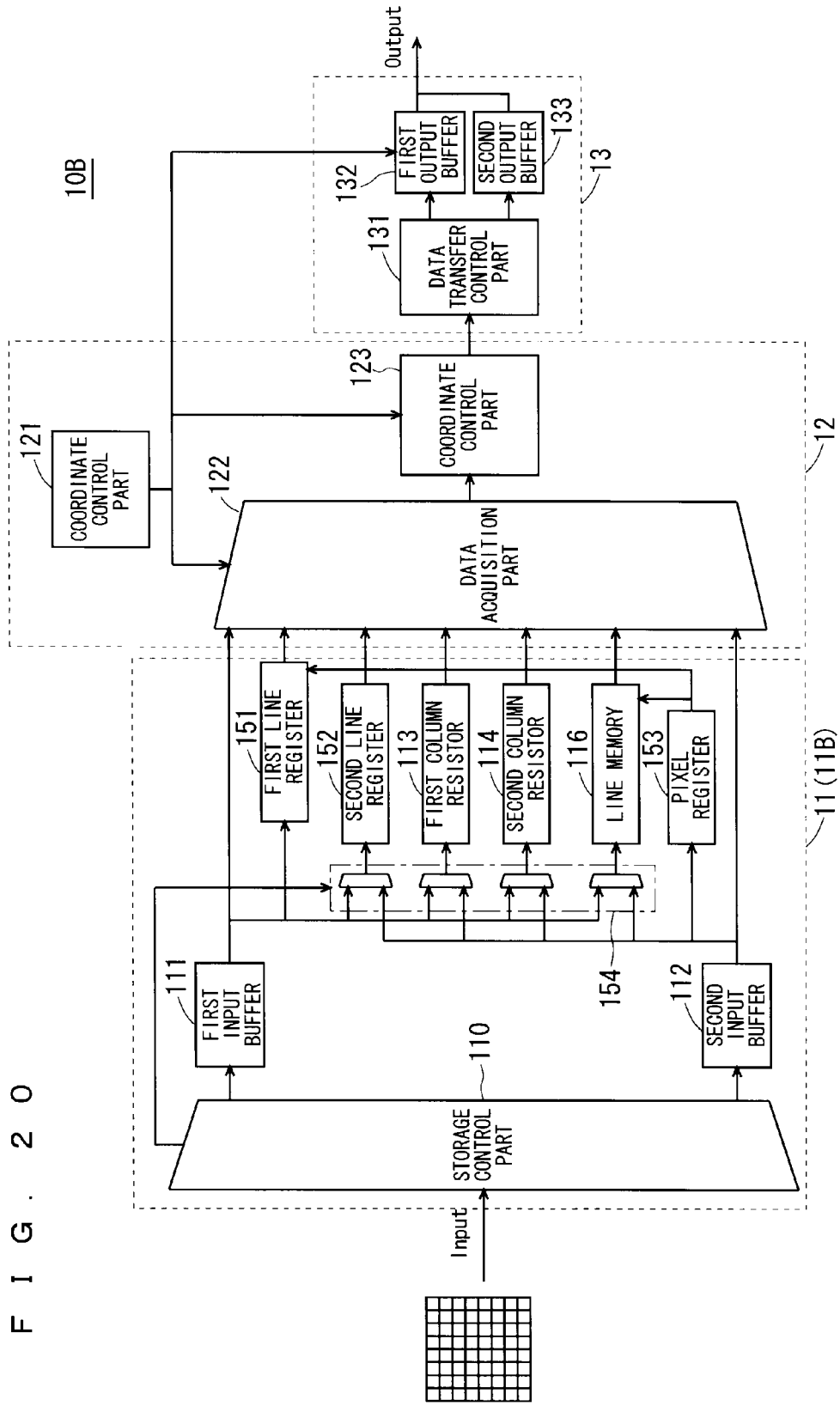

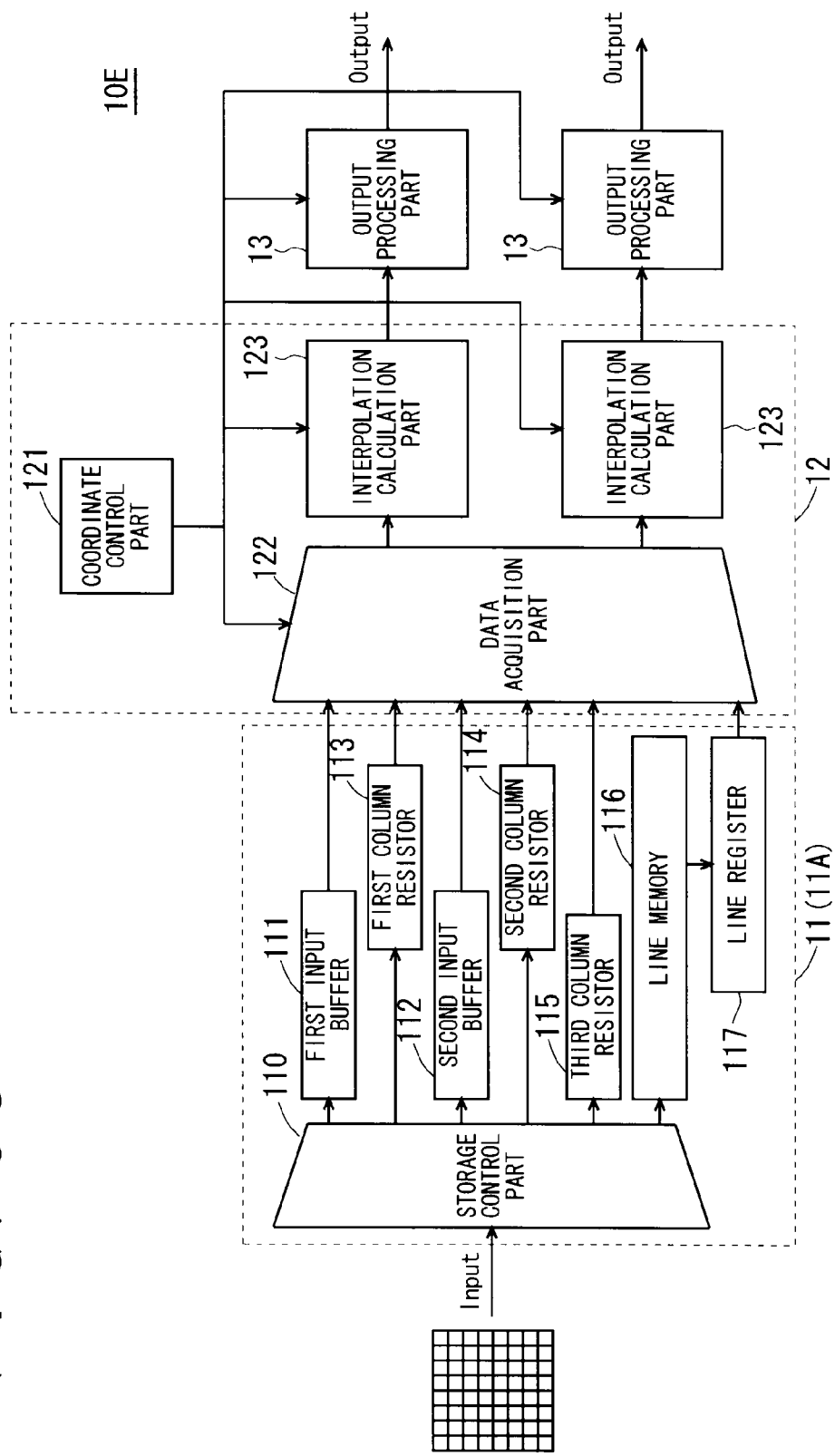
F I G . 3 8

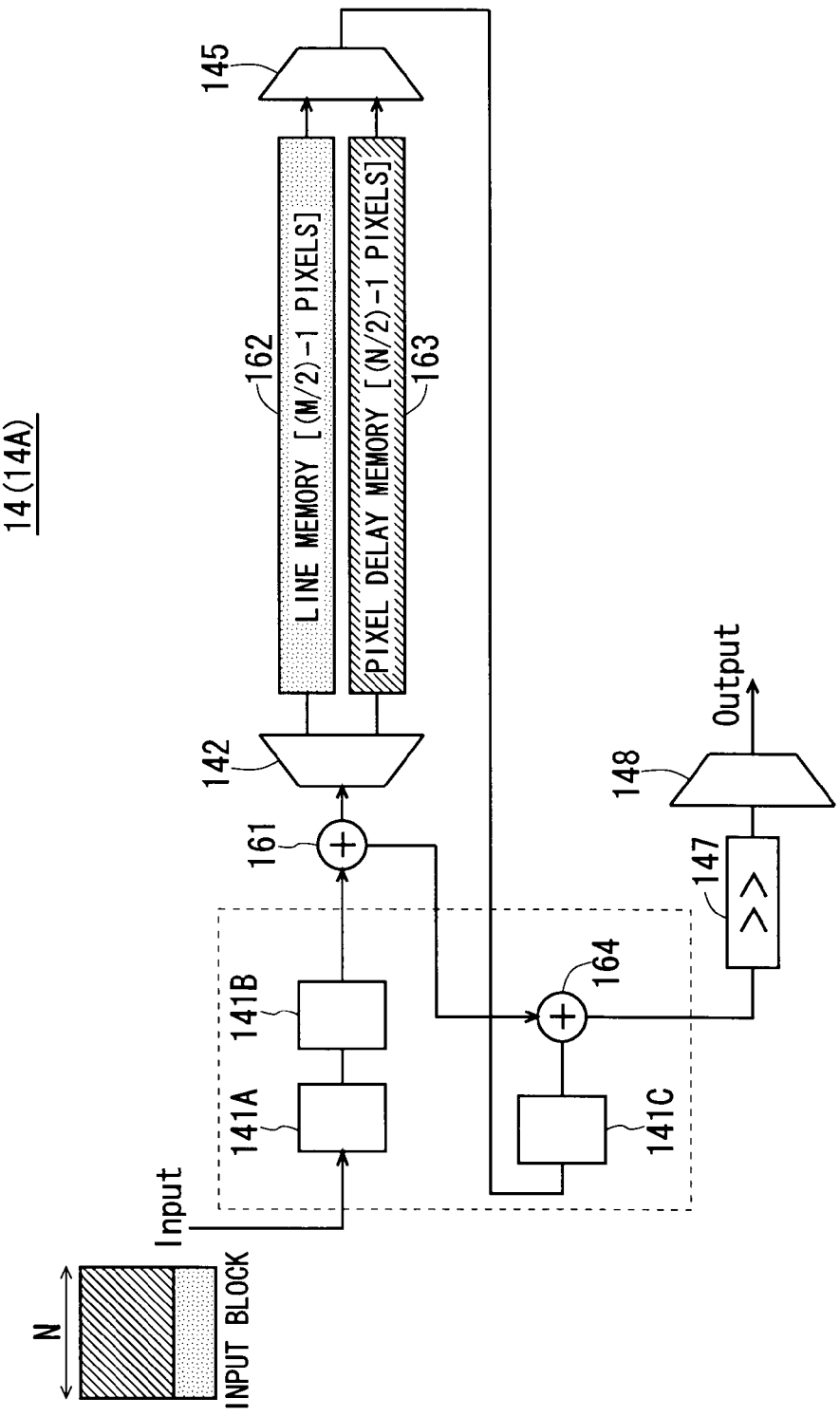

US 8,938,133 B2

IMAGE RESIZING APPARATUS AND METHOD THAT INTERPOLATES IMAGE BLOCKS WITH ABUTTAL REGIONS

BACKGROUND OF THE INVENTION

1. Field of the Invention

The present invention relates to an image processing technology.

2. Description of the Background Art

Generally, there has been a technique of freely changing (resizing) the size of an image obtained by an imaging apparatus or the like by subjecting the image to image processing for enlargement or reduction of the size of the image (for example, Japanese Patent Application Laid-Open No. 1999-283023).

In a case where such a process (also referred to as a "resizing process") of changing the size of an image is performed after an image processing circuit that outputs an image on a block basis, a block of the image (block image) is temporarily stored in a separate memory and, after an entire image is configured, the resizing process is performed on the entire image stored in the memory.

However, temporarily storing the entire image in the separate memory and then performing the resizing process increases the amount of data transfer due to storing of image data in the memory and reading the image data from the memory. This causes failures such as a deteriorated processing speed and increased power consumption.

SUMMARY OF THE INVENTION

An object of the present invention is to provide a technique capable of reducing failures which may be caused by an increase in the amount of data transfer.

To achieve the above object, a first aspect of an image processing apparatus of the present invention includes: a first storage section and a second storage section; a storage control section for sequentially acquiring block images obtained as a result of dividing an input image and storing the block image as a target block image in the first storage section, while storing, in the second storage section, image data of, in a region of the target block image, a region abutting un-inputted block images in the input image, as image data of an abuttal region; and a resizing section for implementing a resizing process for changing the size of the target block image by performing an interpolation calculation using image data of the target block image stored in the first storage section and the image data of the abuttal region stored in the second storage section.

This can reduce failures which may be caused by transfer of image data.

A second aspect of the image processing apparatus of the present invention is based on the first aspect, wherein: the image processing apparatus comprises a plurality of the resizing sections; and the interpolation calculation is performed with an interval of interpolating pixels varying among the resizing sections.

A third aspect of the image processing apparatus of the present invention is based on the first aspect or the second aspect, further including: an output section for sequentially outputting an image obtained as a result of the resizing process, on a specific region basis; and a first average reduction processing section for generating a reduced image by performing a reduction process in which an average of pixel values of pixels included in a rectangular region in an image of the specific region is obtained as a pixel value corresponding to one pixel.

A fourth aspect of the image processing apparatus of the present invention is based on the third aspect, wherein the number of pixels included in the rectangular region is a power of two.

A fifth aspect of the image processing apparatus of the present invention is based on the third aspect or the fourth aspect, further including a second average reduction processing section connected after the first average reduction processing section, for reducing the reduced image by performing a reduction process in which an average of pixel values of pixels included in a rectangular region in the reduced image is obtained as a pixel value corresponding to one pixel.

A method for operating an image processing apparatus of the present invention includes the steps of: sequentially acquiring block images obtained as a result of dividing an input image; storing the sequentially-acquired block image as a target block image in a first storage section, while storing, in a second storage section, image data of, in a region of the target block image, a region abutting un-inputted block images in the input image, as image data of an abuttal region; and implementing a resizing process for changing the size of the target block image by performing an interpolation calculation using image data of the target block image stored in the first storage section and the image data of the abuttal region stored in the second storage section.

According to the present invention, failures which may be caused by transfer of image data can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing a part of a configuration of an image processing apparatus according to a first preferred embodiment of the present invention;

FIG. 3 is a diagram showing a sequence of input of block images to the resizing section;

FIG. 5 is a diagram showing input block images inputted to the resizing section;

FIG. 6 is a diagram showing a block image included in the input image inputted to the resizing section;

FIG. 11 shows a time chart concerning an operation of the resizing section;

FIG. 12 is a diagram showing an object region to be subjected to the resizing process;

FIG. 16 is a flowchart showing the interpolation calculation;

FIG. 19 is a diagram showing a sequence of input of block images to the resizing section;

FIG. 20 is a diagram showing a detailed configuration of the resizing section;

FIG. 38 is a diagram showing a configuration of a resizing section according to a modification; and FIG. 39 is a diagram showing a modification of the internal configuration of the average resizer.

DESCRIPTION OF THE PREFERRED EMBODIMENTS

Hereinafter, some preferred embodiments will be described with reference to the accompanying drawings.

<1. First Preferred Embodiment>

[1-1. Outline]

Figure 2:
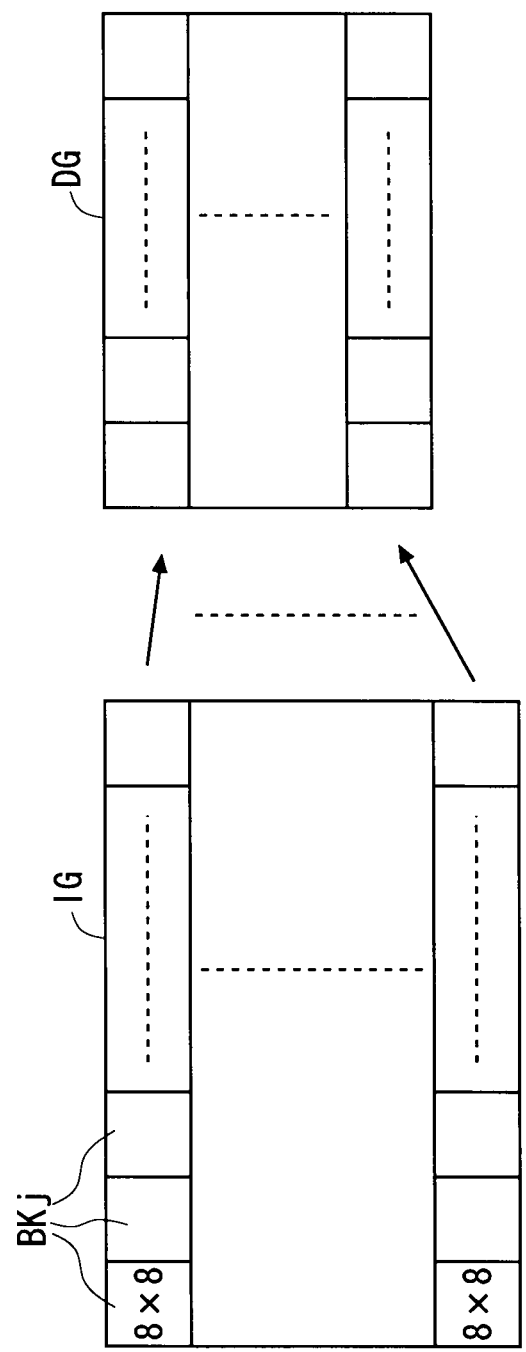
FIG. 2 is a diagram showing an input image inputted to a resizing section and a resized image obtained as a result of a resizing process being performed by the resizing section.

FIG. 1 is a schematic diagram showing a part of a configuration of an image processing apparatus 1 according to a first preferred embodiment. FIG. 2 is a diagram showing an image (input image) prior to being inputted to a resizing section 10A and an image (also referred to as an "output image" or "resized image") DG after being subjected to a resizing process performed by the resizing section 10A. FIG. 3 is a diagram showing a sequence of input of block images to the resizing section 10A. In FIG. 3, the X axis and the Y axis represent coordinate axes with the upper left pixel of an input image IG serving as the origin. In this preferred embodiment, it is assumed that a common coordinate system is used for the input image IG.

As shown in FIG. 1, the image processing apparatus 1 includes a resizing section 10A that changes the size of an image inputted thereto and outputs a resulting image.

Block images which are inputted sequentially to the resizing section 10A on a block basis are obtained as a result of dividing the input image into a plurality of regions. To be specific, as shown in FIG. 2, the input image IG are divided into a plurality blocks BKj each having 8×8 pixels, and inputted sequentially to the resizing section 10A on a divided block basis.

For example, as shown in FIG. 3, the input of block images is performed in a so-called raster order. That is, starting from a block SB that is the upper-left block image in the input image IG, the block images are sequentially inputted along the +X direction, and when the input in a unit line is completed, a new line in the +Y direction starts so that the input of block images is performed in the next line.

The resizing section 10A (FIG. 1) performs the resizing process on each of the inputted block images, and outputs an image obtained as a result of the resizing process on a block basis. A block image (input block image) inputted to the resizing section 10A and a block image (output block image) outputted from the resizing section 10A may be in one-to-one correspondence, or alternatively a plurality of input block images may form a single output block image.

The image processing apparatus 1 is implemented in, for example, an imaging apparatus, a personal computer (PC), a portable information terminal, or the like.

[1-2. Configuration of Resizing section 10A]

Figure 4:
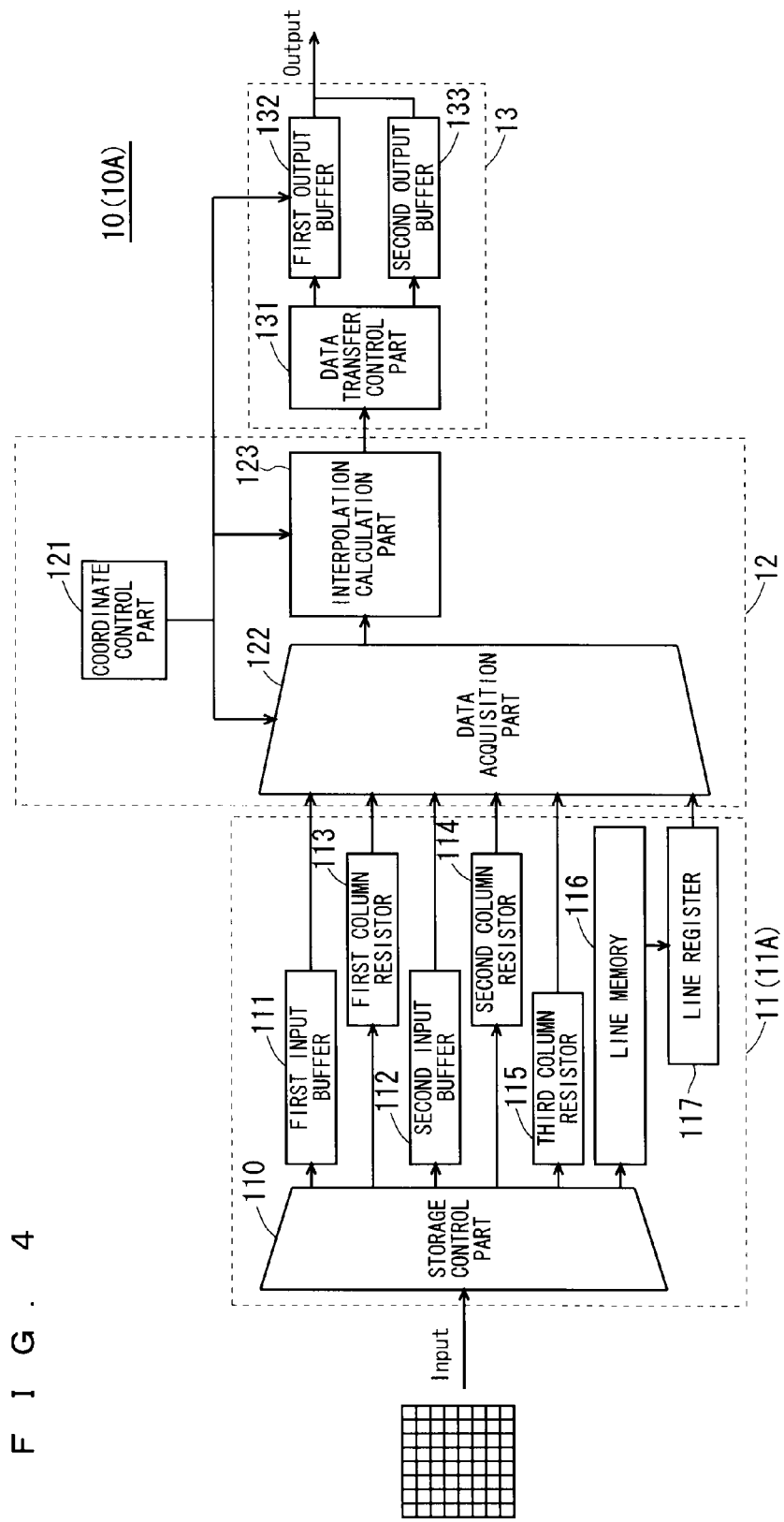
FIG. 4 is a diagram showing a detailed configuration of the resizing section.

Next, a configuration of the resizing section 10A will be described. FIG. 4 is a diagram showing a detailed configuration of the resizing section 10A. FIG. 5 is a diagram showing an input block image BG inputted to the resizing section 10A.

As shown in FIGS. 1 and 4, the resizing section 10A includes an input processing section 11 (11A) for performing data processing on an inputted block image, a computation section (resizing means) 12 for performing the resizing process on image data, and an output processing section 13 for performing an output process on the resized image data.

The input processing section 11 includes a storage control section 110, a first input buffer 111, a second input buffer 112, a first column resistor 113, a second column resistor 114, a third column resistor 115, a line memory 116, and a line register 117.

Each of the first input buffer 111 and the second input buffer 112 is configured by an SRAM, and has a capacity to store the input block image. In this preferred embodiment, each of the input buffers 111 and 112 has a capacity to store an image having 16×16 pixels, for example.

Each of the first column resistor 113, the second column resistor 114, and the third column resistor 115 has a capacity to store vertical image data pieces corresponding to one column (and in more detail, pixel data (pixel value) corresponding to one column of pixels) included in the input block image.

The line memory 116 has a capacity to store horizontal image data pieces corresponding to one line (and in more detail, pixel data corresponding to one line of pixels) included in the input image.

The line register 117 has a capacity to store, in addition to pixel data corresponding to a line of pixels included in the input block image, pixel data corresponding to one pixel. For example, in a case where the number of pixels in a line included in the input block image is eight, the line register 117 has a capacity to store pixel data corresponding to nine pixels.

The storage control section 110 is connected to the input buffers 111 and 112, the column resistors 113, 114, and 115, and the line memory 116, and selectively controls a storage destination of the block image inputted thereto.

More specifically, the storage control section 110 has a function of sequentially obtaining input block images and outputting the input block images to the first input buffer 111 or the second input buffer 112 for the storage therein.

The storage control section 110 outputs the rightmost vertical image data pieces (image data pieces in a region NR hatched with oblique lines in FIG. 5) in the input block image BG, to the first column resistor 113, the second column resistor 114, or the third column resistor 115, for the storage therein. The storage control section 110 outputs the lowermost (bottom edge) horizontal image data pieces (image data pieces in a region ER hatched with vertical lines in FIG. 5) in the input block image BG, to the line memory 116, for the storage therein.

In this manner, in the input processing section 11, a storage process for storing image data pieces of the input block image BG in each storage section is performed under control of the storage control section 110. Hereinafter, vertical image data pieces in the input block image will be also referred to as "unit column data" or "column data", and horizontal image data pieces in the input block image will be also referred to as "unit line data" or "line data". If there is only a small unoccupied region in the storage section at a time of storing an image data piece in the storage section, the image data piece is stored by overwriting.

The computation section 12 includes a coordinate control section 121, a data acquisition section 122, and an interpolation calculation section 123. Based on the block images inputted to the resizing section 10A, the computation section 12 calculates pixel data of a pixel (also referred to as "resized pixel" or "interpolating pixel") that will be included in an image (resized image) obtained as a result of resizing.

The coordinate control section 121 calculates coordinates of each resized pixel in the input image, based on the size of the input image and the size of the resized image. Then, the coordinate control section 121 identifies coordinates of a pixel (also referred to as a "reference pixel") on the input image which is used for obtaining the pixel data of each resized pixel. The coordinate control section 121 outputs coordinate information of the resized pixel to the interpolation calculation section 123 and a data transfer control section 131 (described later), and additionally outputs, for each resized pixel, coordinate information of the reference pixel to the data acquisition section 122.

The data acquisition section 122 has a function of acquiring, based on the coordinate information of the reference pixel inputted from the coordinate control section 121, pixel data of the reference pixel from the storage sections 111 to 115 and 117 at an appropriate timing in accordance with a calculation operation performed by the interpolation calculation section 123, and outputting the pixel data to the interpolation calculation section 123.

The interpolation calculation section 123 has a function of performing an interpolation calculation using the pixel data of the reference pixel inputted from the data acquisition section 122 and generating pixel data of the resized pixel. Details of the interpolation calculation will be described later.

In this manner, the computation section 12 performs the resizing process for calculating pixel data of the resized pixel, and outputs the pixel data obtained as a result of the calculation to the output processing section 13.

The output processing section 13 includes the data transfer control section 131, a first output buffer 132, and a second output buffer 133.

Each of the first output buffer 132 and the second output buffer 133 is configured by an SRAM, and has, for example, the same storage capacity as that of each of the input buffers 111 and 112.

The data transfer control section 131 has a function of determining a transfer destination of the pixel data of the resized pixel outputted from the computation section 12 and transferring the pixel data of the resized pixel to the first output buffer 132 or the second output buffer 133. The data transfer control section 131 also transmits an output instruction signal to the first output buffer 132 and the second output buffer 133 to control an output of the output block image stored in the first output buffer 132 or the second output buffer 133.

[1-3. Operation of Resizing section 10A]

Figure 7:
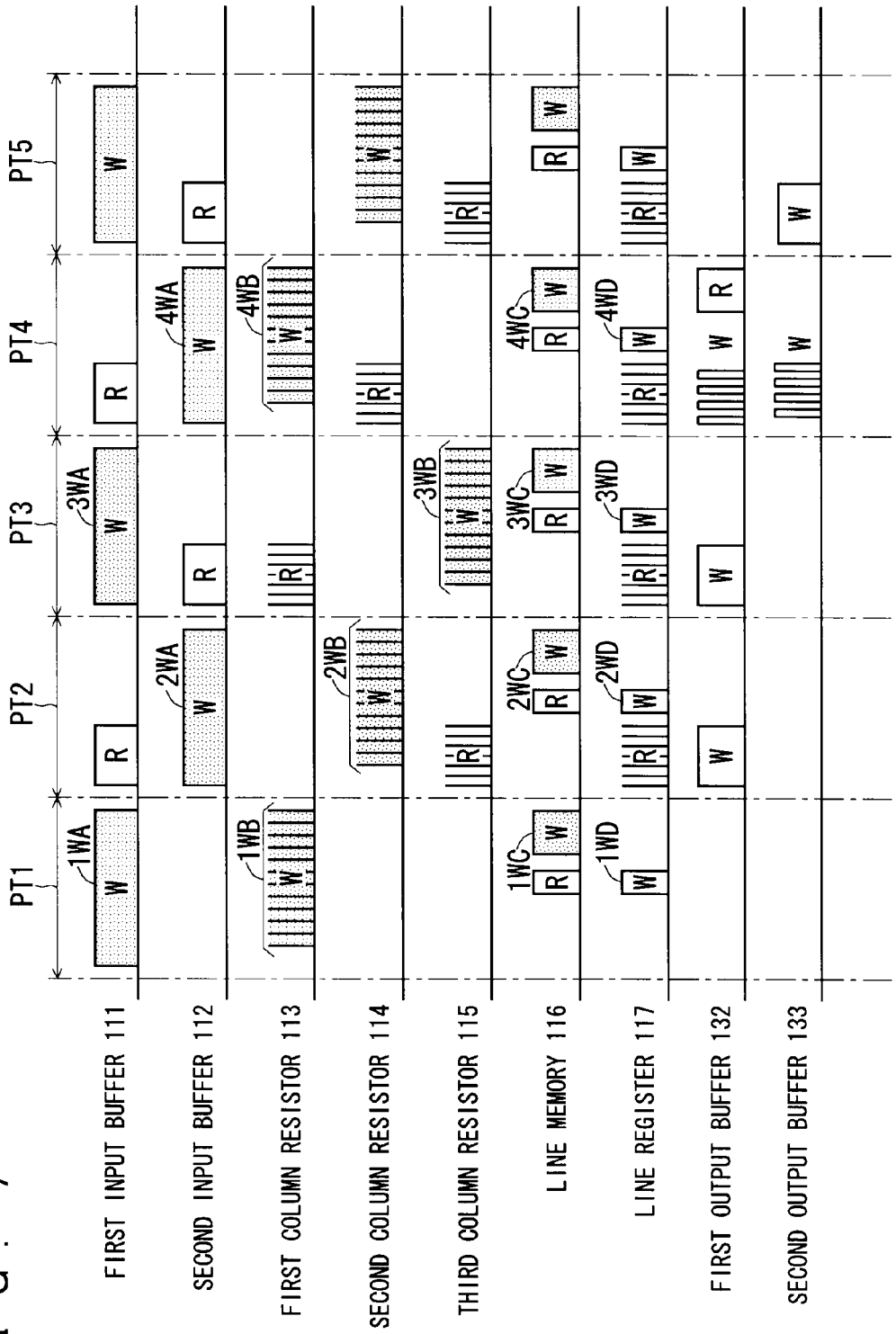
FIG. 7 shows a time chart concerning an operation of the resizing section.
Figure 8:
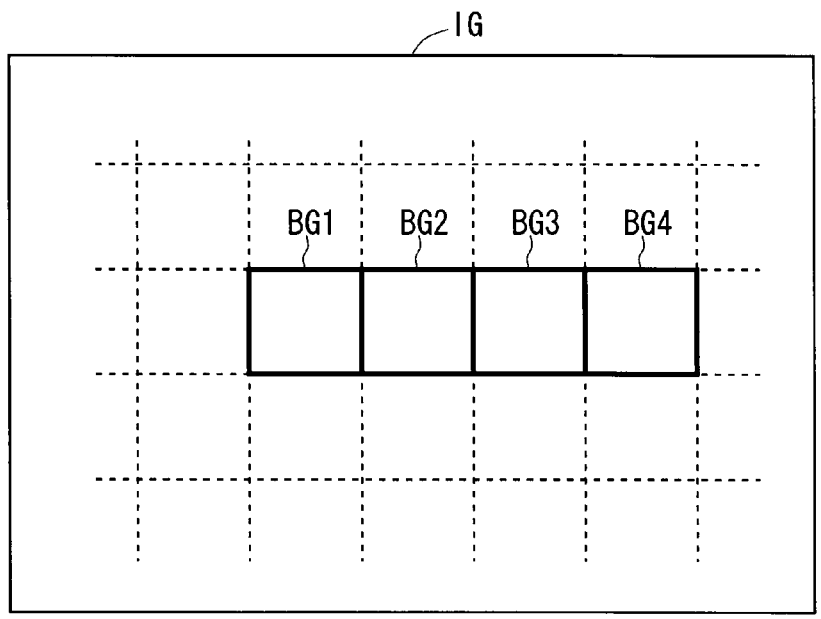
FIG. 8 is a diagram showing block images included in the input image inputted to the resizing section.
Figure 9:
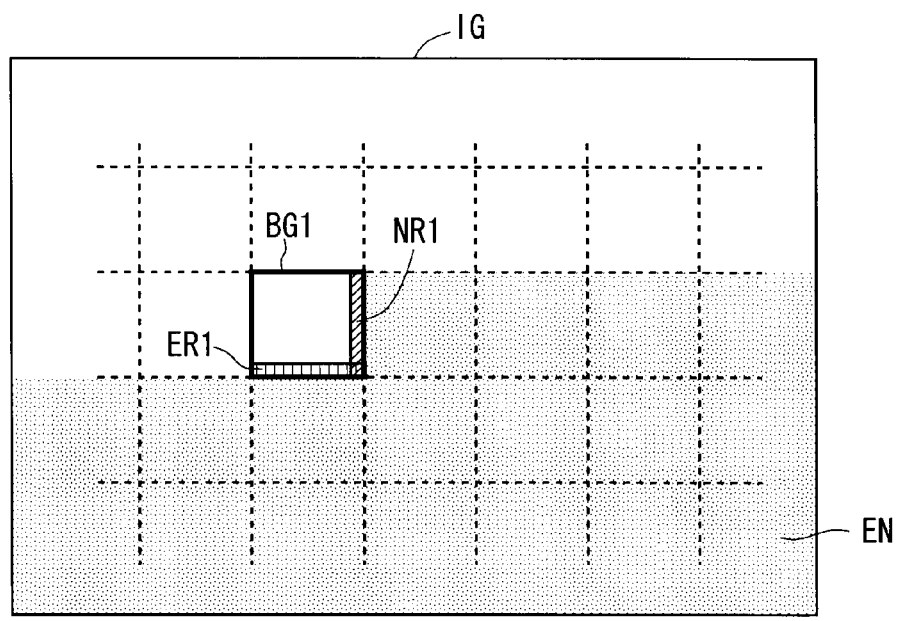
FIG. 9 is a diagram showing a block image included in the input image inputted to the resizing section.
Figure 10:
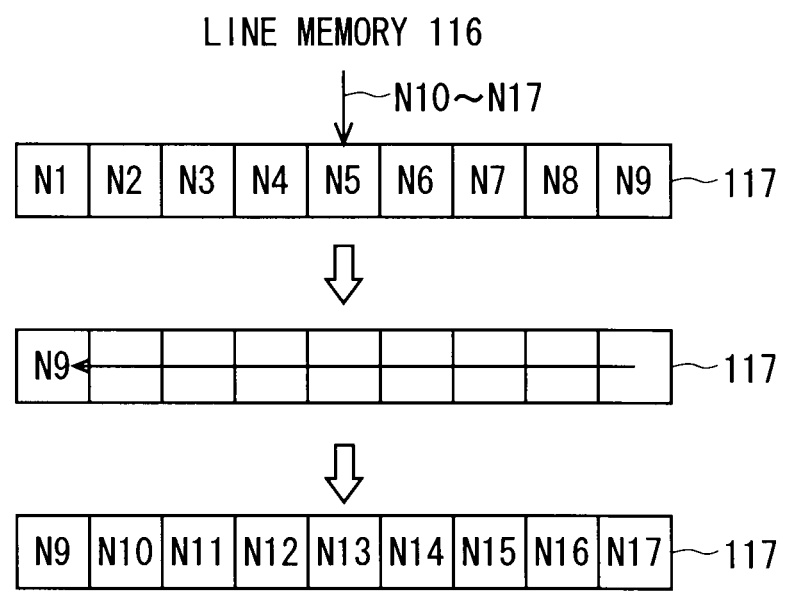
FIG. 10 is a diagram for explaining a writing operation to a line register.

Next, an operation of the resizing section 10A will be described. FIGS. 6, 8, and 9 are diagrams showing the block image in the input image IG inputted to the resizing section 10A. FIG. 7 shows a time chart concerning the operation of the resizing section 10A. FIG. 10 is a diagram for explaining a writing operation to the line register 117.

In the resizing section 10A, the storage process for storing image data of the inputted block image, the resizing process for resizing the inputted block image, and the output process for outputting an image obtained as a result of the resizing process are performed. The following description is based on the assumption that a block image BG1 in the input image IG shown in FIG. 6 is inputted to the resizing section 10A in a first time period PT1 (FIG. 7).

In the first time period PT1 shown in FIG. 7, when the block image (also referred to as a "target block image") BG1 is inputted to the resizing section 10A, the data storage process is performed based on a control by the storage control section 110.

To be more specific, in response to the input of the target block image BG1, the storage control section 110 executes a writing operation 1 WA for storing image data of the target block image BG1 in the first input buffer 111.

In response to the input of the target block image BG1, the storage control section 110 also executes a writing operation 1WB for storing, in the first column resistor 113, the rightmost unit column data (the image data piece in a region NR1 hatched with oblique lines in FIG. 6) of the target block image BG1. Here, in FIG. 7, the writing operation 1WB for writing into the first column resistor 113 is discontinuously performed because the input of the block image BG1 starts from the upper-left pixel in the raster order on a pixel basis and thus an input of pixel data that is an object to be stored occurs at predetermined intervals.

In response to the input of the target block image BG1, the storage control section 110 also executes a writing operation 1WC for storing, in the line memory 116, the lowermost unit line data (the image data piece in a region ER1 hatched with vertical lines in FIG. 6) of the target block image BG1.

Such a series of storage processes is performed each time the block image is inputted.

More specifically, in a second time period PT2 subsequent to the first time period PT1, when a block image BG2 (see FIG. 8) is inputted, the storage control section 110 executes a writing operation 2WA for storing image data of the block image BG2 in the second input buffer 112. In response to the input of the block image BG2, the storage control section 110 also executes a writing operation 2WB for storing, in the second column resistor 114, the rightmost unit column data of the block image BG2. In response to the input of the block image BG2, the storage control section 110 also executes a writing operation 2WC for storing, in the line memory 116, the lowermost unit line data of the block image BG2.

In a third time period PT3 subsequent to the second time period PT2, when a block image BG3 (see FIG. 8) is inputted, the storage control section 110 executes a writing operation 3WA for storing image data of the block image BG3 in the first input buffer 112. In response to the input of the block image BG3, the storage control section 110 also executes a writing operation 3WB for storing, in the third column resistor 115, the rightmost unit column data of the block image BG3. In response to the input of the block image BG3, the storage control section 110 also executes a writing operation 3WC for storing, in the line memory 116, the lowermost unit line data of the block image BG3.

In a fourth time period PT4 subsequent to the third time period PT3, when a block image BG4 (see FIG. 8) is inputted, the storage control section 110 executes a writing operation 4WA for storing image data of the block image BG4 in the second input buffer 112. In response to the input of the block image BG4, the storage control section 110 also executes writing operation 4WB for storing, in the first column resistor 113, the rightmost unit column data of the block image BG4. In response to the input of the block image BG4, the storage control section 110 also executes a writing operation 4WC for storing, in the line memory 116, the lowermost unit line data of the block image BG4.

In this manner, in the storage process, in response to the input of the block image, the block image is stored in either one of the first input buffer 111 and the second input buffer 112. Additionally, in response to the input of the block image, the rightmost unit column data of the block image is stored in any one of the first column resistor 113, the second column resistor 114, and the third column resistor 115, while the lowermost unit line data of the block image is stored in the line memory 116.

A region of the input block image made up of a rightmost column of pixels and a region of the input block image made up of a lowermost line of pixels can also be described as regions abutting un-inputted block images not yet inputted to the resizing section 10A. In more detail, as shown in FIG. 9, a region hatched with a sand pattern is a region EN made up of un-inputted block images in a case where the block image BG1 is inputted. Therefore, in the input block image BG1, a region abutting the un-inputted block images includes the region NR1 made up of a rightmost column of pixels of the input block image BG1 and the region ER1 made up of a lowermost line of pixels of the input block image BG1. If the first input buffer 111 and the second input buffer 112 that store the input block image are generally called first storage means, the respective storage sections that store the image data of the region abutting the un-inputted block images can be generally called second storage means, too.

Prior to executing the writing operations 1WC to 4WC for writing into the line memory 116, object image data to be overwritten in the writing operations 1WC to 4WC is read out and stored in the line register 117. The object image data to be overwritten, that is, the image data to be stored in the line register 117, is the lowermost unit line data of a block image that abuts the upper side of the currently-inputted target block image, and is also referred to as "abutting line data".

During execution of writing operations 1WD to 4WD (see FIG. 7) for writing the abutting line data to the line register 117, pixel data of one pixel already stored in the line register 117 is left. For example, as shown in FIG. 10, it is assumed that line data including nine pixels of N1 to N9 that are continuous in the +X direction is stored in the line register 117. In this state, if abutting line data including eight pixels of N10 to N17 that are continuous in the +X direction is inputted from the line memory 116 to the line register 117, the line register 117 stores the pixel data N9 in the last register into the head register. Then, the line register 117 stores the newly inputted abutting line data of N10 to N17 such that the newly inputted abutting line data can be continuous with the pixel data of N9. Such writing operations 1WD to 4WD create a state in which abutting line data in a region (abut region) abutting the upper side of the target block image and pixel data of a pixel adjacent to the left side of the abut region are stored in the line register 117 so as to be continuous with each other in the +X direction. Since the abutting line data and the pixel data stored in the line register 117 are continuous with each other, they will be sometimes referred to as "continuous line data".

Next, the resizing process will be described. FIG. 11 shows a time chart concerning an operation of the resizing section 10A. FIG. 12 is a diagram showing an object region to be subjected to the resizing process.

After the storage process for storing the target block image BG1 is completed in the first time period PT1, then in the second time period PT2, the resizing process is performed on the target block image BG1. In the resizing process, the data acquisition section 122 reads, from each storage section, pixel data of a reference pixel that is used for the resizing process.

For example, in the resizing process being performed on the target block image BG1, as shown in FIG. 11, reading operations 1RE, 1RF, and 1RG are performed in the second time period PT2, for reading out pixel data of reference pixels from the first input buffer 111, the third column resistor 115, and the line register 117, respectively.

In the reading operation 1RE on the first input buffer 111, pixel data of a reference pixel is read out from the pixels of the target block image BG1.

In the reading operation 1RF on the third column resistor 115, pixel data of a reference pixel is read out from the rightmost column of pixels of the block image BG0. As shown in FIG. 12, the rightmost unit column data of the block image BG0 stored in the third column resistor 115 is image data of an abuttal region RK abutting the target block image BG1.

In the reading operation 1RG on the line register 117, pixel data of a reference pixel is read out from the pixels included in the continuous line data. As shown in FIG. 12, the continuous line data stored in the line register 117 is made up of image data pieces (abutting line data) in a region RL corresponding to a lowermost line of a block image BG01 that abuts the upper side of the target block image BG1 and pixel data of a lower-right pixel PD of a block image BG00 adjacent to the left side of the block image BG01.

Here, if pixels that can be read out as the reference pixels in the reading operations 1RE, 1RF, and 1RG are collectively considered, a region made up of the pixels that can be read out is a region RS having 9×9 pixels and including the target block image BG1, as shown in FIG. 12. That is, in the resizing process on the target block image BG1, the interpolation calculation is performed using pixel data of the pixels included in a region (also referred to as an "extension region" or "reference region") RS obtained by extending the target block image BG1.

Also in the resizing process on each input block image, similarly to the resizing process on the target block image BG1, the interpolation calculation is performed using pixel data of pixels included in a reference region obtained by extending the input block image, to obtain pixel data of resized pixels. The reference region that is an object to be subjected to the resizing process can also be described as being set by the storage process performed by the input processing section 11.

Figure 13:
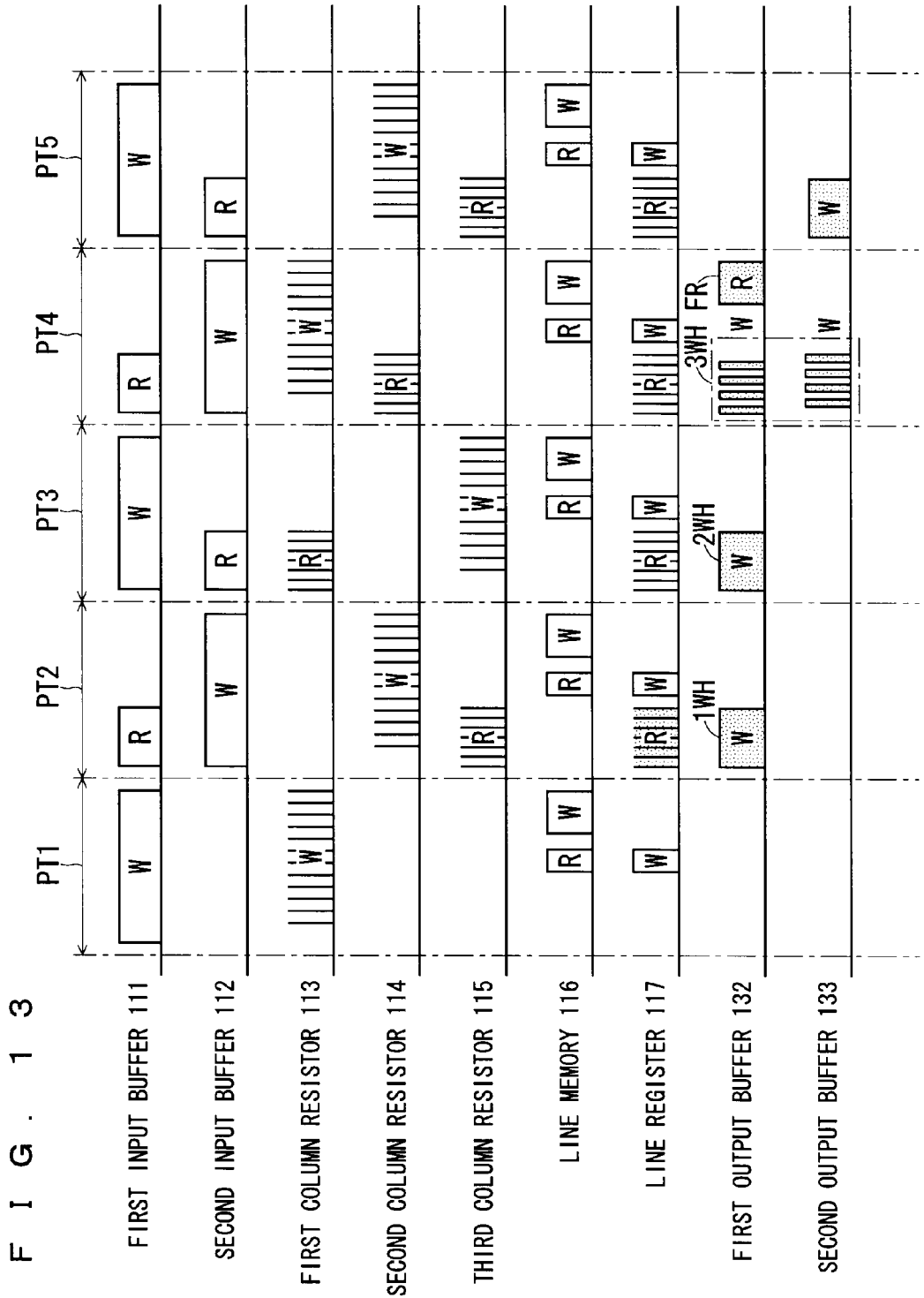
FIG. 13 shows a time chart concerning an operation of the resizing section.
Figure 14:
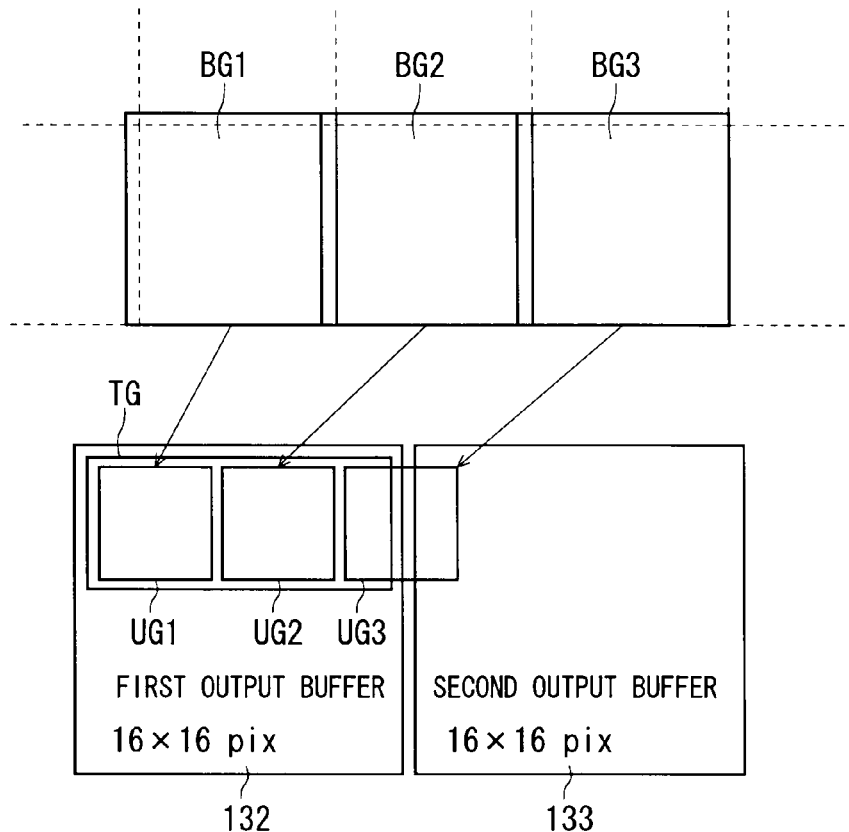
FIG. 14 is a diagram schematically showing block images to be stored in an output buffer.

Next, the output process will be described. FIG. 13 is a time chart concerning an operation of the resizing section 10A. FIG. 14 is a diagram schematically showing block images to be stored in the output buffers 132 and 133.

The pixel data of the resized pixels are sequentially outputted to the data transfer control section 131. The data transfer control section 131 transfers the pixel data of the resized pixels to the first output buffer 132 or the second output buffer 133.

For example, as shown in FIG. 13, after the resizing process on the target block image BG1 is completed in the second time period PT2, a writing operation 1WH for writing the pixel data of the resized pixels into the first output buffer 132 is executed in the second time period PT2. As shown in FIG. 14, as a result of the writing operation 1WH, a block image UG1 generated in the resizing process on the target block image BG1 is stored in the first output buffer 132.

In the data transfer to the output buffers 132 and 133 performed by the data transfer control section 131, a transfer destination is switched at a time point when data corresponding to horizontal pixels are stored in an output buffer that is the current transfer destination. For example, as shown in FIG. 14, in a case where all data of horizontal pixels are completed in the first output buffer 132 by storing in the first output buffer 132 a part of a block image UG3 generated in the resizing process on the block image BG3, image data pieces of the rest of the block image UG3 are stored in the second output buffer 133. In a case where the transfer destination is switched in this manner, writing operations 3WH for writing into the first output buffer 132 and the second output buffer 133 are alternately executed as shown in FIG. 13.

When all data of the horizontal pixels are completed in the output buffer 132 or 133, the data transfer control section 131 transmits an output instruction signal to that output buffer 132 or 133. The output block image is read out from that output buffer 132 or 133 having received the output instruction signal, and outputted to the outside of the resizing section 10A. For example, as shown in FIG. 14, if a part of the block image UG3 is stored in the first output buffer 132, all data of the horizontal pixels are completed in the first output buffer 132. Therefore, the data transfer control section 131 transmits the output instruction signal to the first output buffer 132. In response to reception of the output instruction signal, the first output buffer 132 executes a reading operation FR (FIG. 13) for reading the stored data, so that the data is, as an output block image TG, outputted to the outside.

In this manner, in the output process performed by the output processing section 13, an output block image that is a specific region of the resized image is sequentially outputted.

[1-4. Interpolation Calculation]

Figure 15:
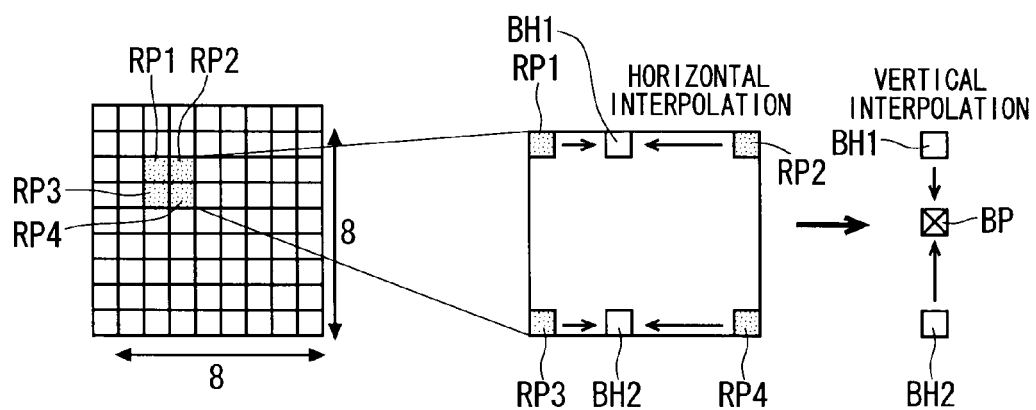
FIG. 15 is a diagram showing an outline of an interpolation calculation.
Figure 17:
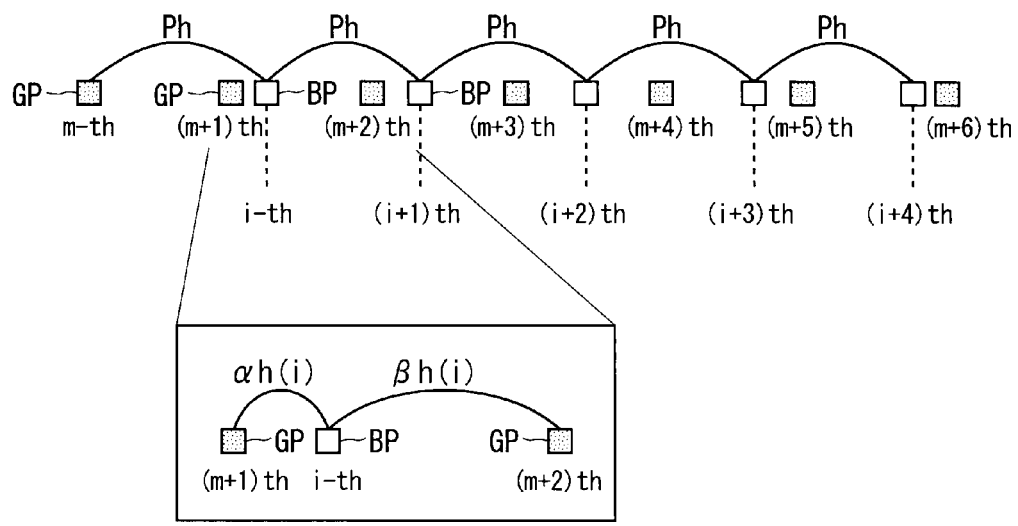
FIG. 17 is a diagram showing a positional relationship between each pixel and a corresponding resized pixel with respect to a horizontal direction on the input image.
Figure 18:
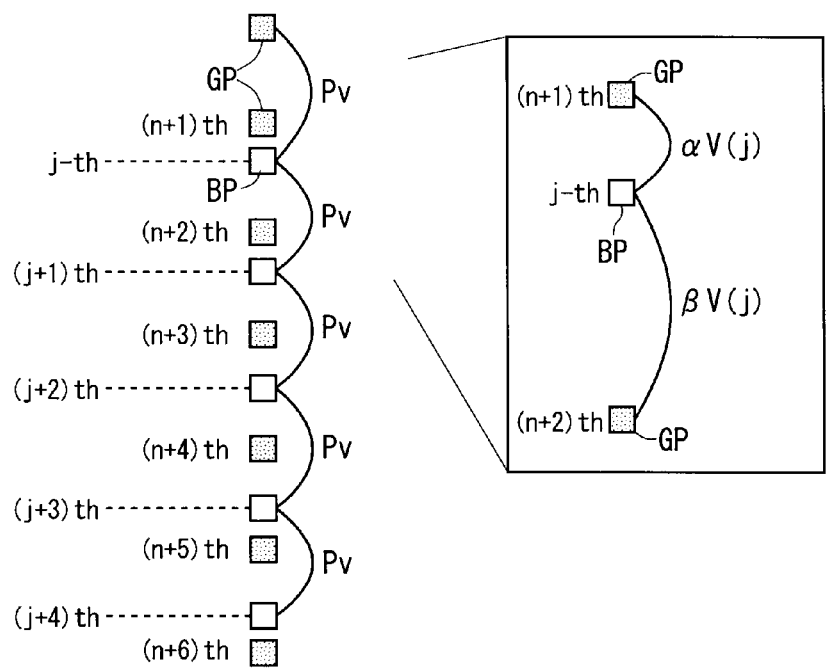
FIG. 18 is a diagram showing a positional relationship between each pixel and a corresponding resized pixel with respect to a vertical direction on the input image.

Next, the interpolation calculation performed by the computation section 12 will be described. This preferred embodiment illustrates a case of adopting a bilinear interpolation method as an interpolation method to perform the interpolation calculation. FIG. 15 is a diagram showing an outline of the interpolation calculation. FIG. 16 is a flowchart of the interpolation calculation. FIG. 17 is a diagram showing a positional relationship between each pixel GP and a corresponding resized pixel BP with respect to the horizontal direction on the input image. FIG. 18 is a diagram showing a positional relationship between each pixel GP and a corresponding resized pixel BP with respect to the vertical direction on the input image.

As shown in FIG. 15, in the interpolation calculation of this preferred embodiment, four pixels on the input image that surround the resized pixel are identified as reference pixels RP1 to RP4. After the four reference pixels RP1 to RP4 are identified, a horizontal interpolation is performed on each set of reference pixels lining up in the horizontal direction (and more specifically, each of a set of the reference pixels RP1 and RP2 and a set of the reference pixels RP3 and RP4). Thus, two horizontal interpolating pixels BH1 and BH2 are calculated. Then, a vertical interpolation is further performed using the two horizontal interpolating pixels BH1 and BH2. Thus, pixel data of the resized pixel (interpolating pixel) BP is calculated.

More specifically, the interpolation calculation is performed through operation steps shown in FIG. 16.

Firstly, in step SP11, the coordinate control section 121 calculates coordinates of each resized pixel BP on the input image based on the size of the input image and the size of the resized image.

To be more specific, in step SP11, an interpolation interval (horizontal interpolation interval) "Ph" in the horizontal direction and an interpolation interval (vertical interpolation interval) "Pv" in the vertical direction are calculated using the following expressions (1) and (2), respectively.

[Math. 1]
$$Ph=(GNh-1)/(RNh+1) \tag{1}$$

[Math. 2]
$$Pv=(GNv-1)/(RNv+1) \tag{2}$$

In the expression (1), "GNh" represents the number of horizontal pixels of the input image, and "RNh" represents the number of horizontal pixels of the resized image. In the expression (2), "GNv" represents the number of vertical pixels of the input image, and "RNv" represents the number of vertical pixels of the resized image.

The coordinates of each resized pixel BP on the input image are obtained by cumulatively summing the interpolation intervals with the upper-left pixel of the input image serving as the origin.

In more detail, on the input image, each pixel GP of the input image and a resized pixel BP have the positional relationship as shown in FIG. 17 with respect to the horizontal direction (X direction). Accordingly, considering the upper-left pixel of the input image as the origin, the X-coordinate of the i-th (i represents a natural number) resized pixel BP in the +X direction is the horizontal interpolation interval "Ph"×i. Likewise, on the input image, each pixel GP of the input image and a resized pixel BP have the positional relationship as shown in FIG. 18 with respect to the vertical direction (Y direction). Accordingly, considering the upper-left pixel of the input image as the origin, the Y-coordinate of the j-th (j represents a natural number) resized pixel BP in the +Y direction is the vertical interpolation interval "Pv"×j.

That is, the coordinates of the resized pixel BP that is the i-th in the X direction and the j-th in the Y direction are (Ph×i, Pv×j).

In next step SP12, coordinates of the reference pixels RP1 to RP4 used for calculating pixel data of the resized pixel are identified based on the coordinates of the resized pixel BP. Putting the (i, j)th resized pixel BP at the center, the coordinates of the reference pixel RP1 located at the upper left side of the resized pixel BP are ([Ph×i], [Pv×j]). Here, the notation [ ] denotes Gauss' notation, and for example, [z] represents the largest integer not greater than the real number z.

Likewise, the coordinates of the reference pixel RP2 at the upper right side of the (i,j)th resized pixel BP are ([Ph×i]+1, [Pv×j]), the coordinates of the reference pixel RP3 at the lower left side of the (i, j)th resized pixel BP are ([Ph×i], [Pv×j]+1), and the coordinates of the reference pixel RP4 at the lower right side of the (i, j)th resized pixel BP are ([Ph×i]+1, [Pv×j]+1).

In step SP13, an interpolation coefficient used for the interpolation calculation is calculated. To be specific, as shown in FIG. 17, horizontal interpolation coefficients "αh(i)" and "βh(i)" used for calculating pixel data of the i-th pixel BP in the X direction are calculated by using the expressions (3) and (4), respectively. As shown in FIG. 18, vertical interpolation coefficients "αv(j)" and "βv(j)" used for calculating pixel data of the j-th pixel BP in the Y direction are calculated by using the expressions (5) and (6), respectively. In the expressions (3) to (6), the notation [ ] denotes Gauss' notation.

[Math.3]
$$\alpha h(i)=(Ph\times i)-[Ph\times i] \quad (3)$$

[Math. 4]
$$\beta h(i)=[Ph\times i]+1-(Ph\times i) \quad (4)$$

[Math. 5]
$$\alpha v(j)=(Pv\times j)-[Pv\times j] \quad (5)$$

[Math. 6]
$$\beta v(j)=[Pv\times j]+1-[Pv\times j] \quad (6)$$

In step SP14, the data acquisition section 122 acquires the pixel data of the reference pixels RP1 to RP4 from each storage section 111 to 116 based on the coordinates of the reference pixels RP1 to RP4.

In step SP15, the interpolation calculation section 123 performs a horizontal interpolation using the bilinear interpolation method based on the pixel data of the reference pixels RP1 to RP4 and the horizontal interpolation coefficients "αh(i)" and "βh(i)". Thus, two horizontal interpolating pixels BH1 and BH2 are calculated.

In step SP16, a vertical interpolation using the bilinear interpolation method is performed based on the two horizontal interpolating pixels BH1 and BH2 and the vertical interpolation coefficients "αv(j)" and "βv(j)". Thus, pixel data of the resized pixel BP is calculated.

In this manner, in the interpolation calculation of this preferred embodiment, the pixel data of the resized pixel BP is calculated through the operation steps shown in FIG. 16.

As described above, the resizing section 10 includes the first storage means, the second storage means, the storage control section 110, and the computation section 12. The storage control section 110 sequentially acquires a block image obtained as a result of dividing the input image, and stores the block image, as a target block image, in the first storage means. The storage control section 110 also stores, in the second storage means, image data of, in a region of the target block image, a region abutting un-inputted block images in the input image, as image data of an abuttal region. The computation section 12 performs an interpolation calculation using the image data of the target block image stored in the first storage means and the image data of the abuttal region stored in the second storage means, thereby implementing the resizing process for changing the size of the target block image.

In the image processing apparatus 1 having the resizing section 10, the block images can be sequentially subjected to the resizing process, and therefore it is not necessary to temporarily store the entire image in an external memory for the resizing process. This can reduce failures such as a deteriorated processing speed and increased electric power consumption which may be caused by an increase in the amount of transfer of image data, as compared with performing the resizing process while temporarily storing the entire image in another external memory.

In the resizing process on the input block image, pixels included in an extended region obtained by extending the region of the input block image can be read out as the reference pixels used for the resizing process. Therefore, even pixel data of interpolating pixels existing at the boundary between block images can be accurately calculated.

<2. Second Preferred Embodiment>

Next, a second preferred embodiment will be described. Although in the first preferred embodiment, the block images are inputted to the resizing section 10A in a so-called raster order, in the second preferred embodiment, the block images are inputted to the resizing section 10 in a sequence different from the raster order. In the configuration of a resizing section 10B, the parts in common with the resizing section 10A according to the first preferred embodiment are denoted by the same corresponding reference numerals, and descriptions thereof are omitted. FIG. 19 is a diagram showing a sequence of input of the block images to the resizing section 10B.

[2-1. Outline and Configuration]

To the resizing section 10B of the second preferred embodiment, the block images are inputted in a sequence indicated by the arrows in FIG. 19. This sequence is the same as the sequence of input of block images to an image encoding section that encodes an image in the JPEG XR format, and also referred to as a "JPEG-XR input sequence".

The sequence of input of the block images according to the first preferred embodiment is the same as the sequence of input of block images to an image encoding section that encodes an image in the JPEG format. An image processing section provided before the resizing section 10A or 10B outputs the block images in a predetermined sequence in consideration of input to the image encoding section. That is, the resizing section 10A or 10B and the image encoding section can be connected in parallel with the image processing section provided before them.

Next, a configuration of the resizing section 10B will be described. FIG. 20 is a diagram showing a detailed configuration of the resizing section 10B.

As shown in FIG. 20, the resizing section 10B includes an input processing section 11B, the computation section 12, and the output processing section 13. The computation section 12 and the output processing section 13 are identical to those of the first preferred embodiment, and therefore descriptions thereof are omitted here.

Since in the resizing section 10B of this preferred embodiment, the block images are sequentially inputted in the JPEG-XR input sequence, a configuration of the input processing section 11B and a storage process performed by the input processing section 11B are different from those of the first preferred embodiment. In the following, the configuration of the input processing section 11B and the storage process will be described in the mentioned order.

The input processing section 11B (FIG. 20) includes the storage control section 110, the first input buffer 111, the second input buffer 112, the first column resistor 113, the second column resistor 114, the line memory 116, a first line register 151, a second line register 152, a pixel register 153, and a selector group 154.

Each of the first line register 151 and the second line register 152 has a capacity to store, in addition to pixel data corresponding to a line of pixels included in the input block image, pixel data of one pixel. For example, in a case where the number of pixels in a line included in the input block image is eight, each of the line registers 151 and 152 has a capacity to store pixel data corresponding to nine pixels.

The pixel register 153 has a capacity to store pixel data of one pixel.

The selector group 154 includes a plurality of selectors. Each of the selectors switches data to be outputted, based on a control signal supplied from the storage control section 110.

The storage control section 110 is connected to the first input buffer 111 and the second input buffer 112, and selectively controls a storage destination of the block image inputted thereto. More specifically, the storage control section 110 has a function of outputting the input block images to the first input buffer 111 or the second input buffer 112 for the storage therein.

The storage control section 110 transmits the control signal to each of the selectors included in the selector group 154, to control an output of the selector.

In the input processing section 11B, a storage process for storing image data of the input block image in each storage section is performed under control of the storage control section 110.

[2-2. Operation of Resizing section 10B]

Figure 21:
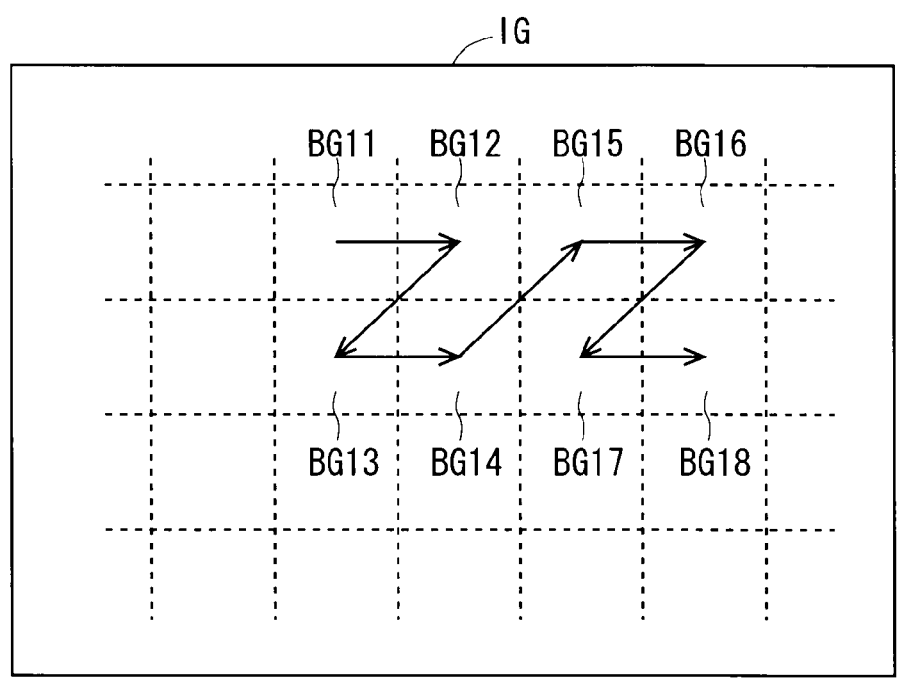
FIG. 21 is a diagram showing block images included in the input image inputted to the resizing section.

Next, an operation of the resizing section 10B will be described. FIG. 21 is a diagram showing block images BG11 to BG17 in the input image IG that is inputted to the resizing section 10B. FIGS. 22 to 33 are diagrams for explaining the operation of the resizing section 10B according to the second preferred embodiment.

Similarly to the first preferred embodiment, the storage process performed by the resizing section 10B is for the purpose of allowing a reference region obtained by extending the input block image to be an object that is to be subjected to the resizing process. However, contents of the storage process is different from the first preferred embodiment. In the following, operations of the resizing section 10B concerning the storage process and the resizing process will be described in detail, based on an assumption that eights block images BG11 to BG18 in the input image IG shown in FIG. 21 are sequentially inputted.

Figure 22:
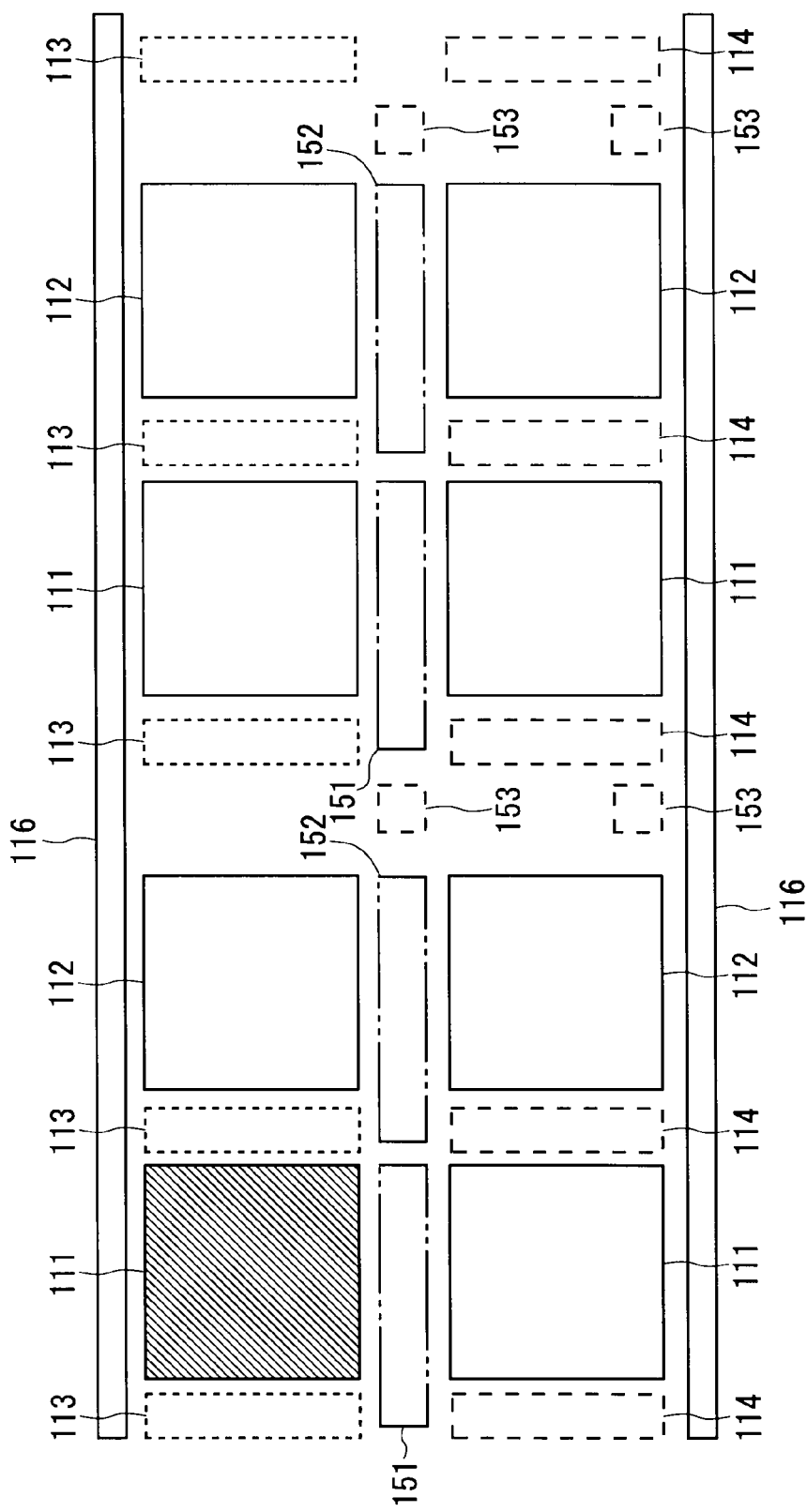
FIG. 22 is a diagram for explaining an operation of a resizing section according to a second preferred embodiment.

Firstly, when the block image BG11 is inputted, the block image BG11 is stored in the first input buffer 111 (see FIG. 22).

Figure 23:
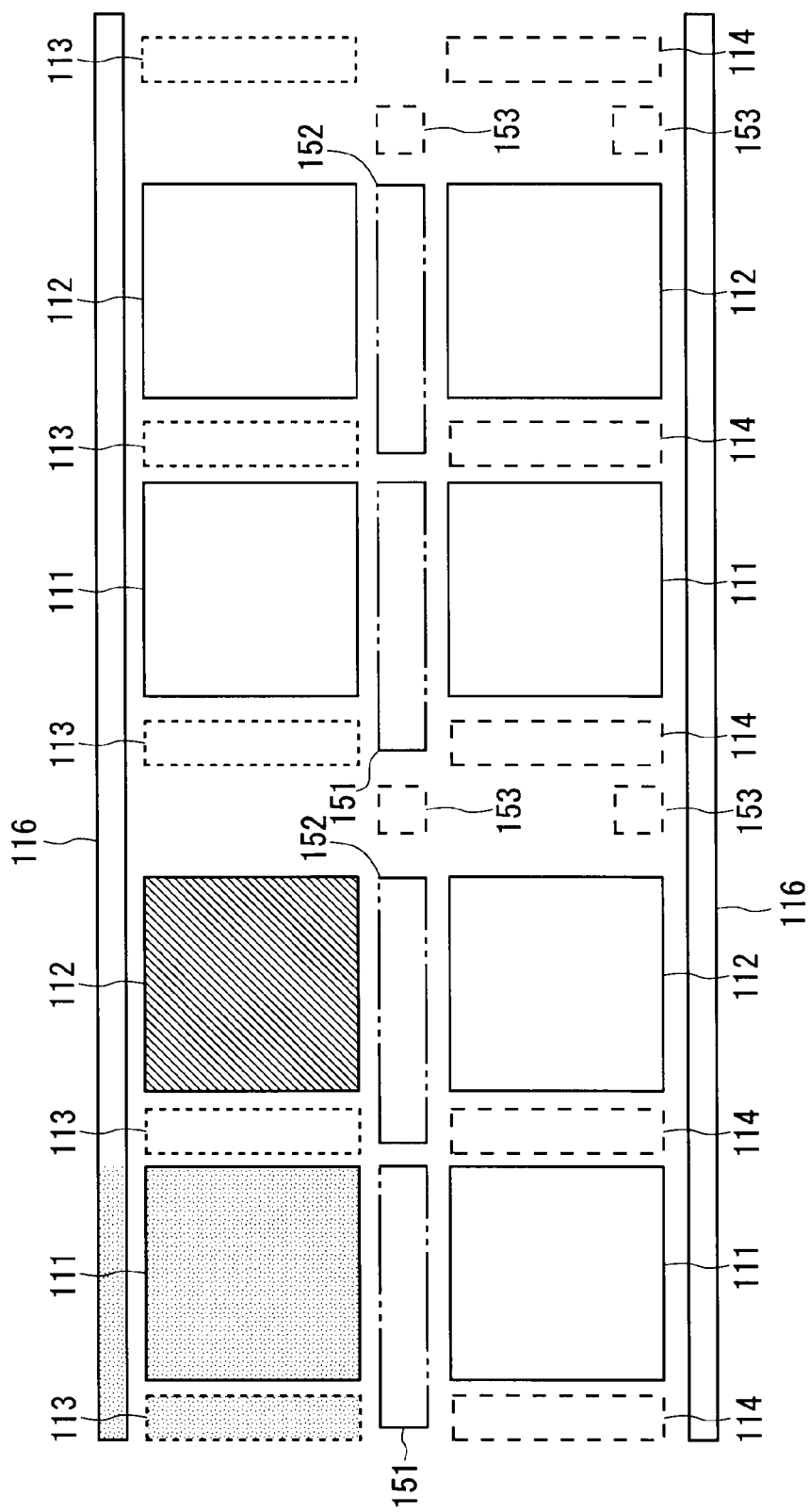
FIG. 23 is a diagram for explaining the operation of the resizing section according to the second preferred embodiment.
Figure 24:
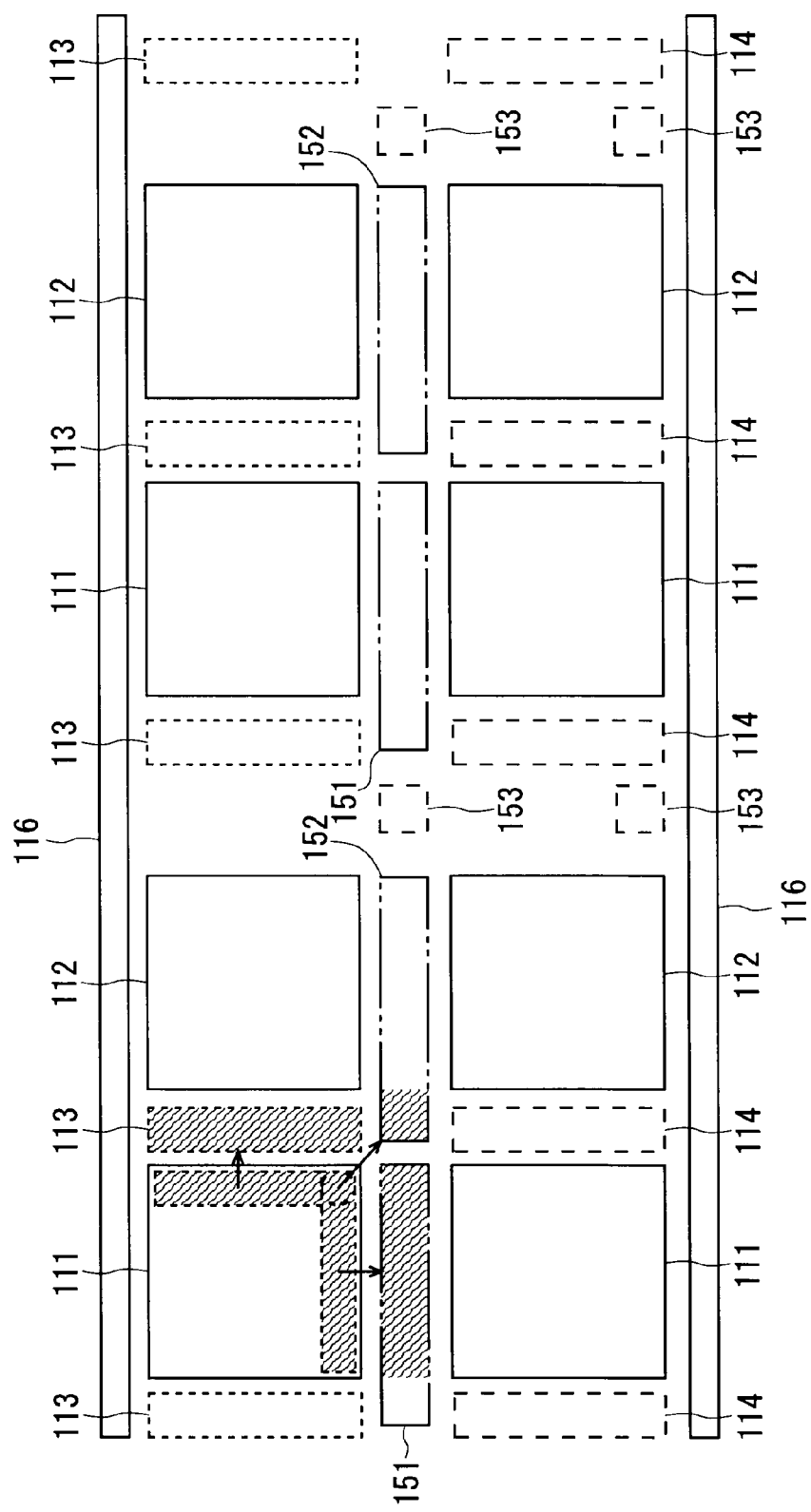
FIG. 24 is a diagram for explaining the operation of the resizing section according to the second preferred embodiment.

When the next block image BG12 is inputted, the block image BG12 is stored in the second input buffer 112, and additionally the resizing process is performed on the block image BG11 stored in the first input buffer 111 (see FIG. 23). The resizing process on the block image BG11 is performed with reference to the block image BG11 stored in the first input buffer 111, unit column data stored in the first column resistor 113, and continuous line data stored in the line memory 116. Thus, a reference region to be subjected to the resizing process on the block image BG11 is a region hatched with a sand pattern shown in FIG. 23.

After the resizing process on the block image BG11 is completed, the rightmost unit column data of the block image BG11 stored in the first input buffer 111 is stored in the first column resistor 113, and the lowermost unit line data of the block image BG11 is stored right-aligned in the first line register 151. Also, pixel data of the pixel located at the lower-right corner of the block image BG11 stored in the first input buffer 111 is stored left-aligned in the second line register 152 (see FIG. 24).

Figure 25:
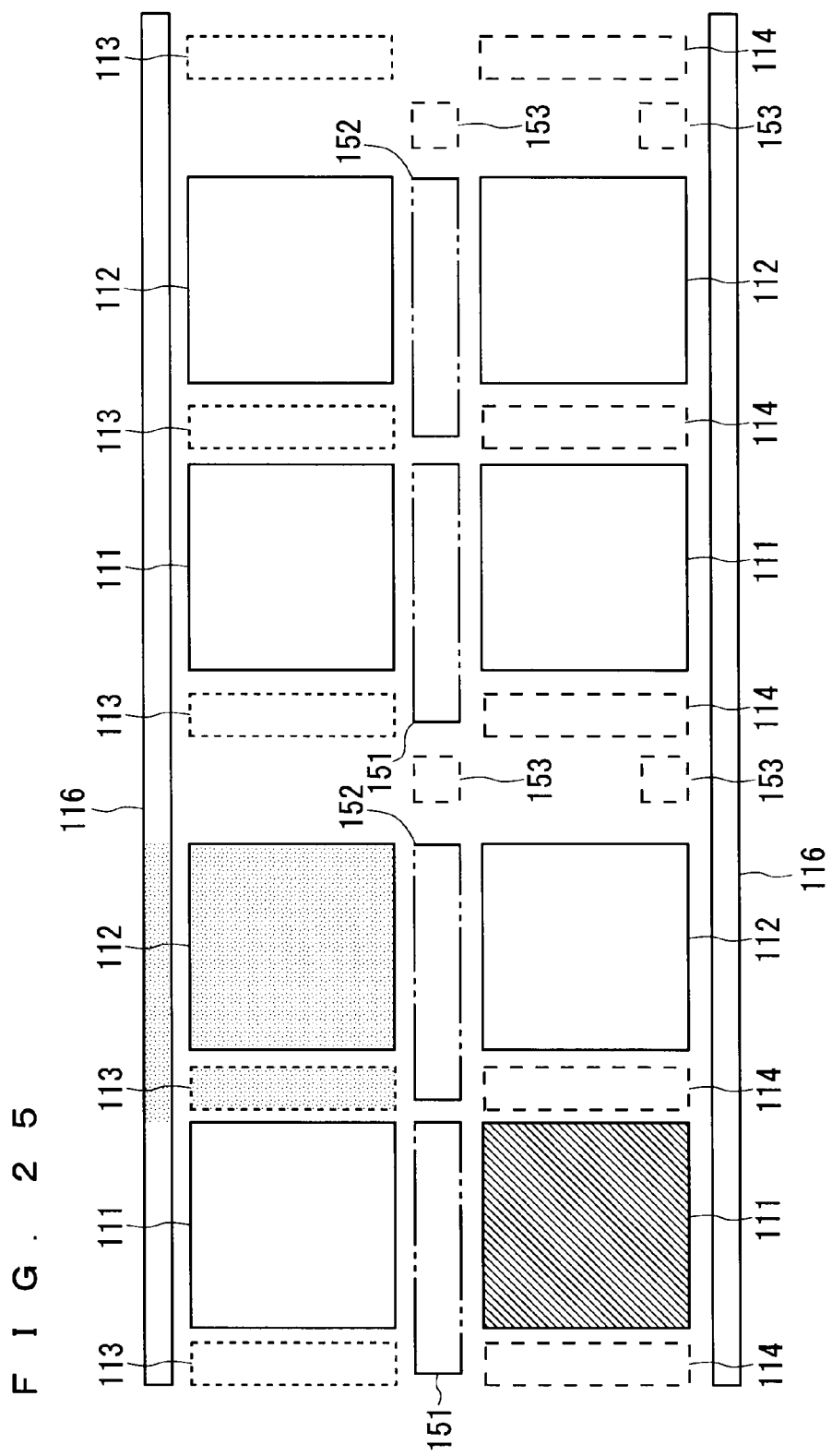
FIG. 25 is a diagram for explaining the operation of the resizing section according to the second preferred embodiment.
Figure 26:
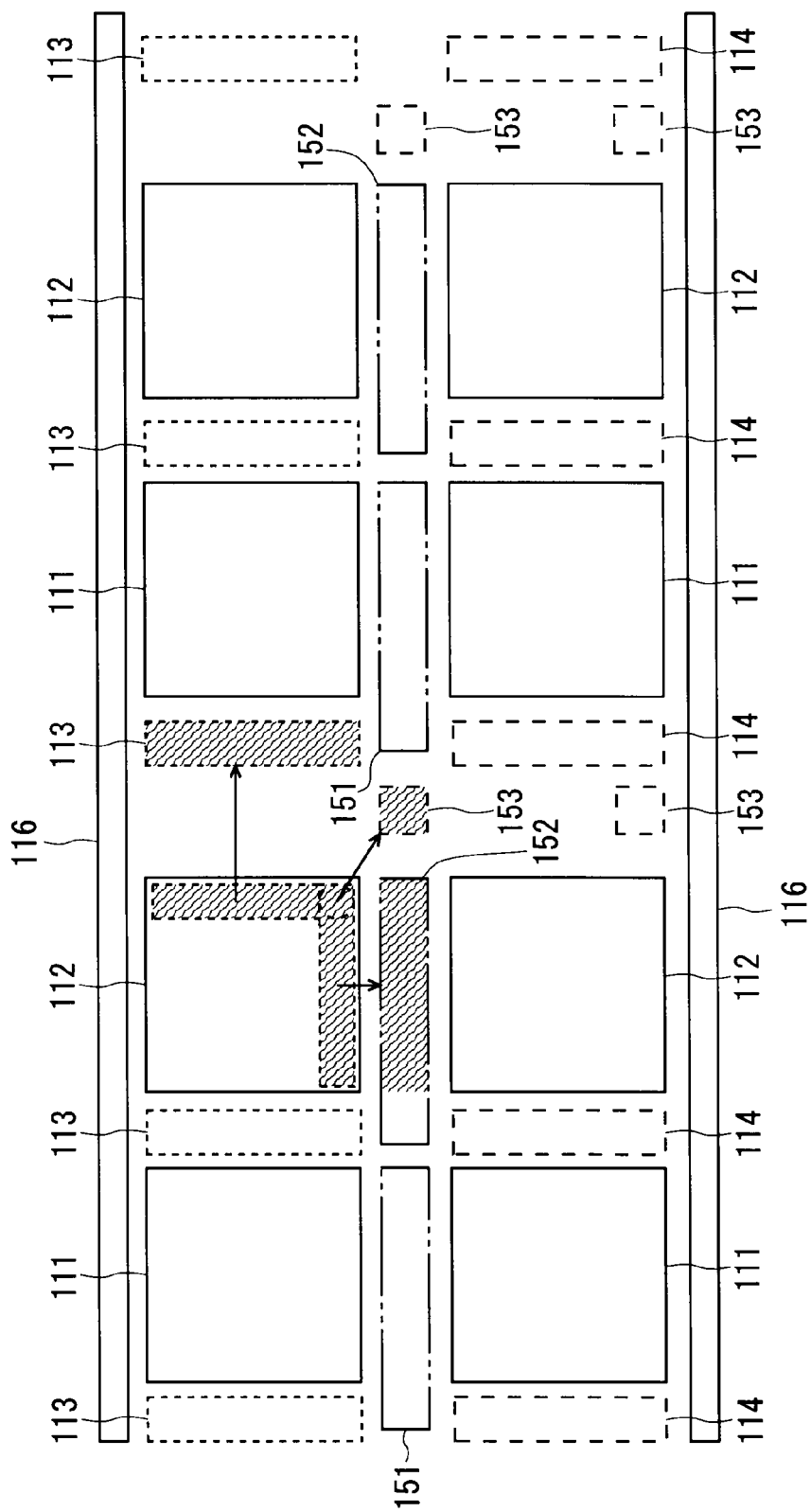
FIG. 26 is a diagram for explaining the operation of the resizing section according to the second preferred embodiment.

When the next block image BG13 is inputted, the block image BG13 is stored in the first input buffer 111, and additionally the resizing process is performed on the block image BG12 stored in the second input buffer 112 (see FIG. 25). The resizing process on the block image BG12 is performed with reference to the block image BG12 stored in the second input buffer 112, the unit column data stored in the first column resistor 113, and the continuous line data stored in the line memory 116. Thus, a reference region to be subjected to the resizing process on the block image BG12 is a region hatched with a sand pattern shown in FIG. 25.

After the resizing process on the block image BG12 is completed, the rightmost unit column data of the block image BG12 stored in the second input buffer 112 is stored in the first column resistor 113, and the lowermost unit line data of the block image BG12 is stored right-aligned in the second line register 152. Also, pixel data of the pixel located at the lower-right corner of the block image BG12 stored in the second input buffer 112 is stored in the pixel register 153 (see FIG. 26).

Figure 27:
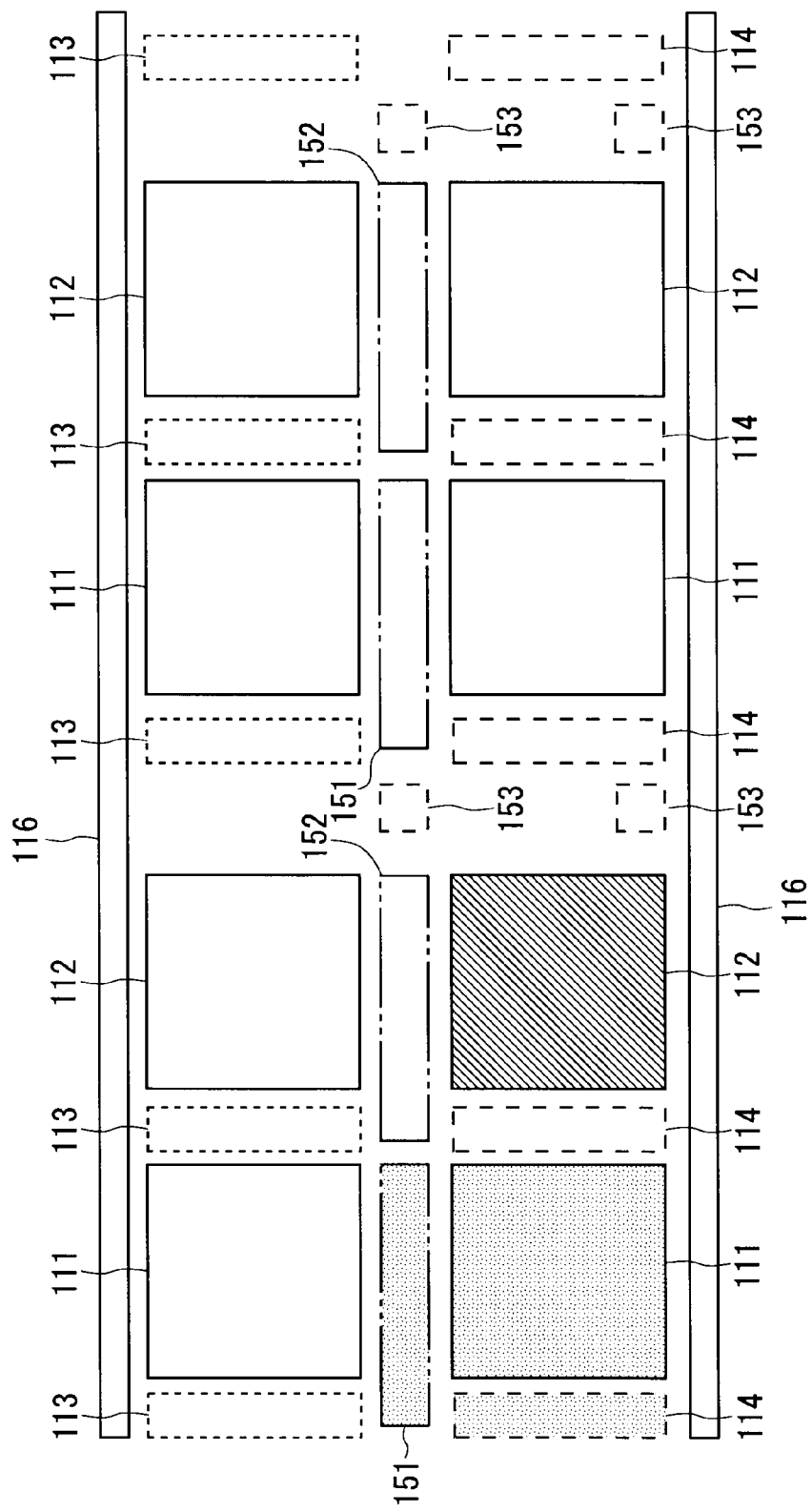
FIG. 27 is a diagram for explaining the operation of the resizing section according to the second preferred embodiment.

When the next block image BG14 is inputted, the block image BG14 is stored in the second input buffer 112, and additionally the resizing process is performed on the block image BG13 stored in the first input buffer 111 (see FIG. 27). The resizing process on the block image BG13 is performed with reference to the block image BG13 stored in the first input buffer 111, the unit column data stored in the second column resistor 114, and the continuous line data stored in the first line register 151. Thus, a reference region to be subjected to the resizing process on the block image BG13 is a region hatched with a sand pattern shown in FIG. 27.

Figure 28:
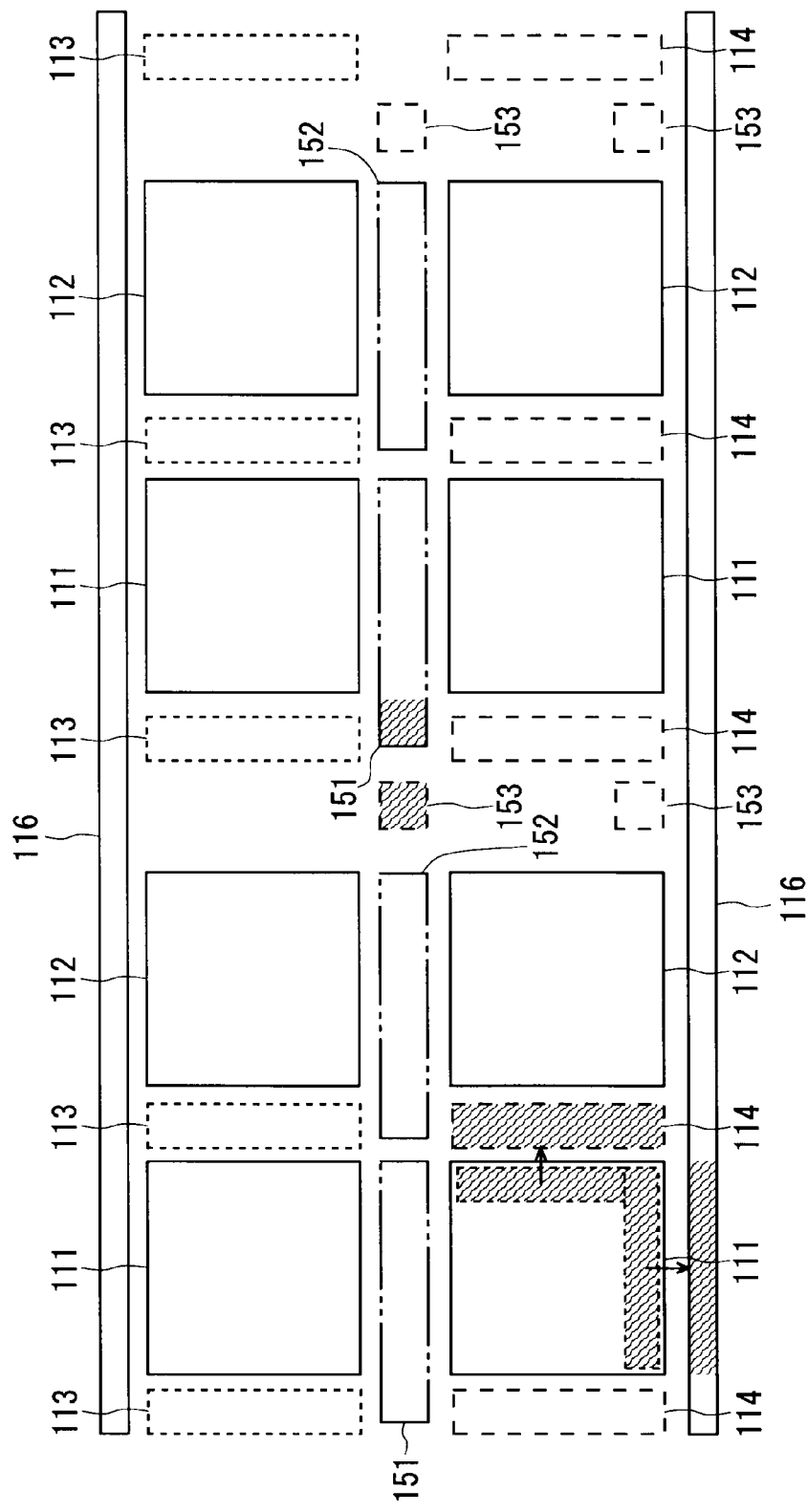
FIG. 28 is a diagram for explaining the operation of the resizing section according to the second preferred embodiment.

After the resizing process on the block image BG13 is completed, the rightmost unit column data of the block image BG13 stored in the first input buffer 111 is stored in the second column resistor 114, and the lowermost unit line data of the block image BG13 is stored in the line memory 116 (see FIG. 28).

At a timing of completion of the resizing process on the block image BG13, the pixel data of the pixel located at the lower-right corner of the block image BG12 stored in the pixel register 153 is stored left-aligned in the first line register 151 (see FIG. 28).

Figure 29:
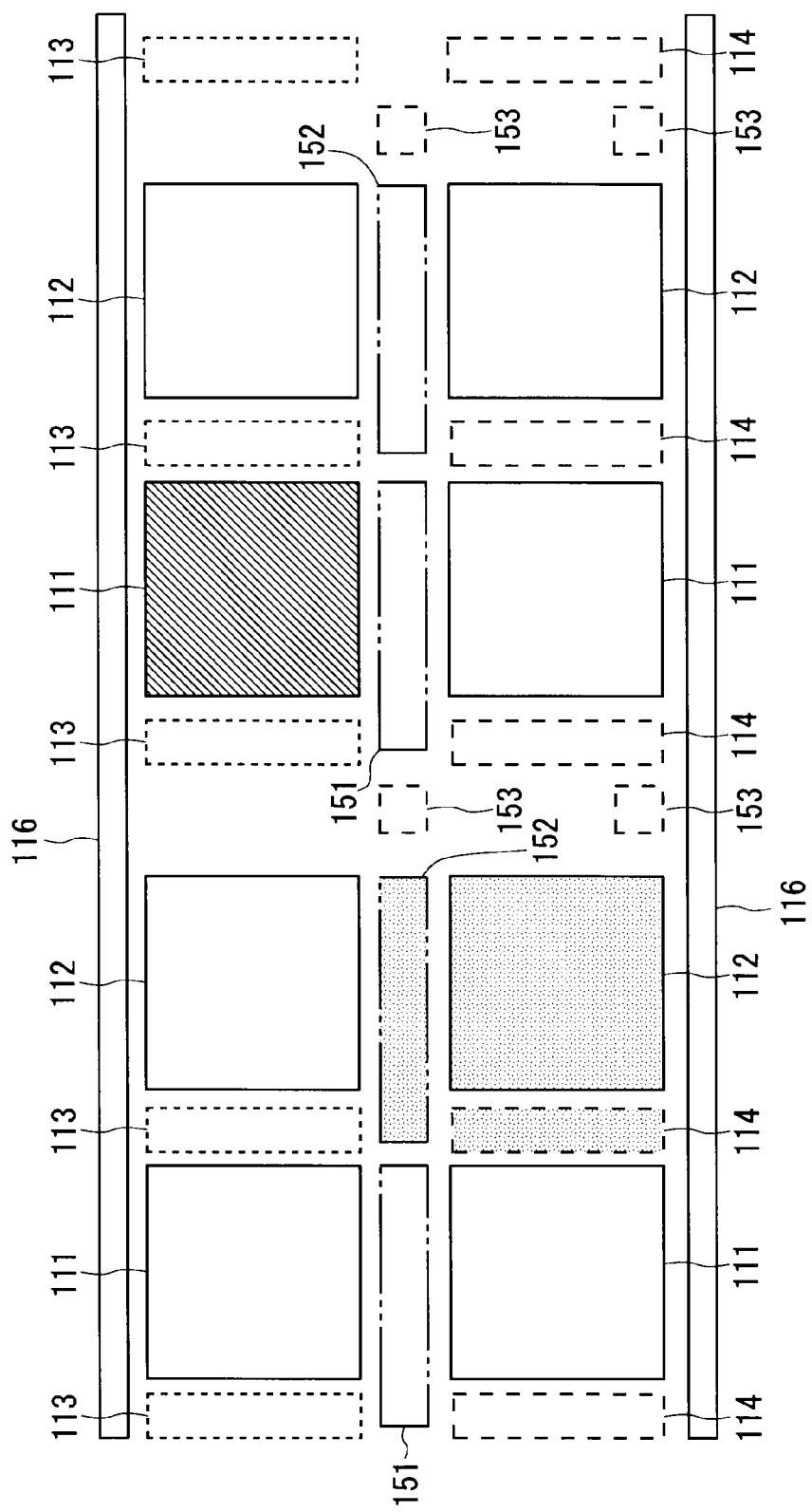
FIG. 29 is a diagram for explaining the operation of the resizing section according to the second preferred embodiment.
Figure 30:
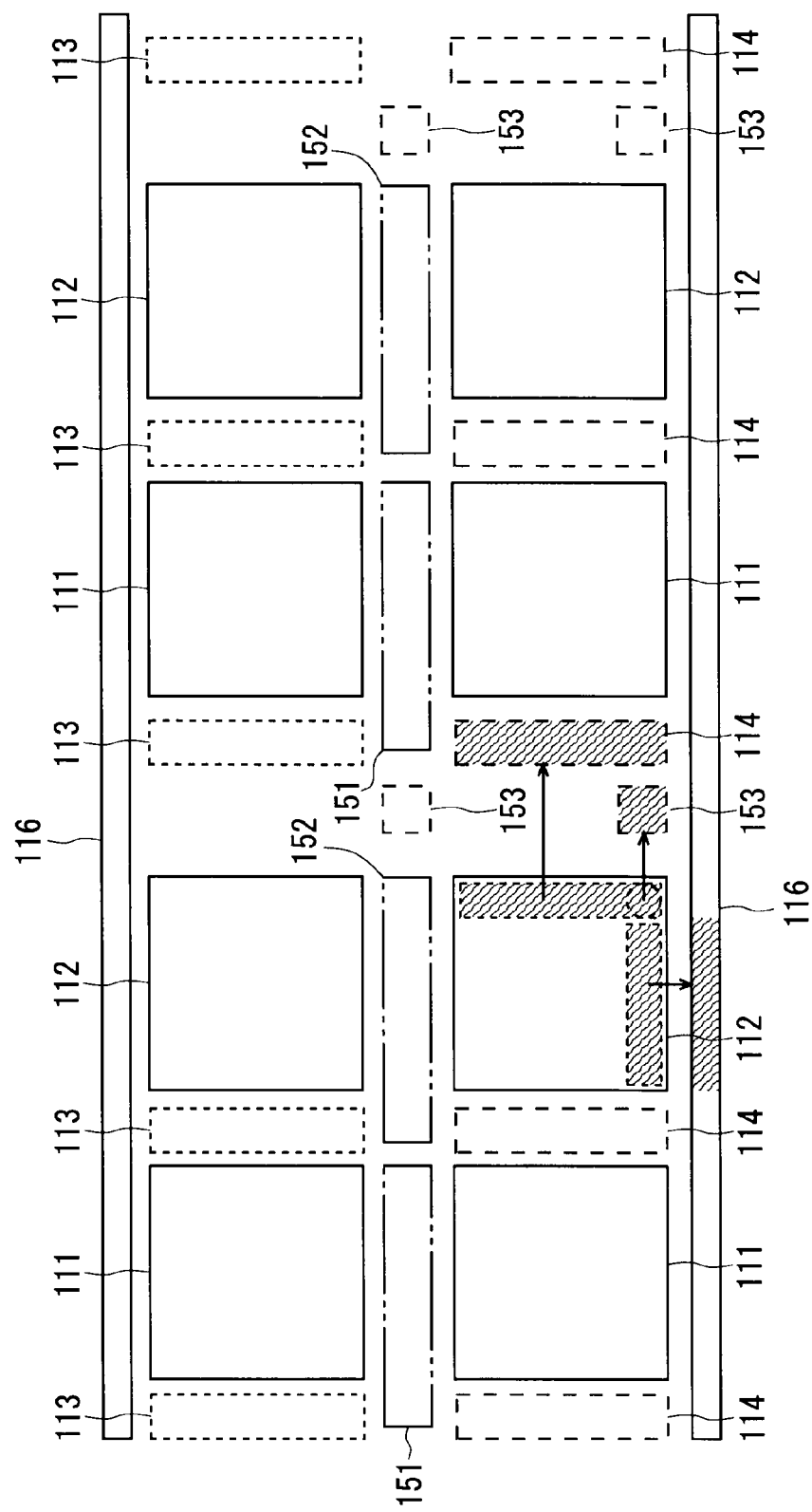
FIG. 30 is a diagram for explaining the operation of the resizing section according to the second preferred embodiment.

When the next block image BG15 is inputted, the block image BG15 is stored in the first input buffer 111, and additionally the resizing process is performed on the block image BG14 stored in the second input buffer 112 (see FIG. 29). The resizing process on the block image BG14 is performed with reference to the block image BG14 stored in the second input buffer 112, the unit column data stored in the second column resistor 114, and the continuous line data stored in the second line register 152. Thus, a reference region to be subjected to the resizing process on the block image BG14 is a region hatched with a sand pattern shown in FIG. 29.

After the resizing process on the block image BG14 is completed, the rightmost unit column data of the block image BG14 stored in the second input buffer 112 is stored in the second column resistor 114. Also, the lowermost unit line data of the block image BG14 stored in the second input buffer 112, except the rightmost pixel data thereof, is stored in the line memory 116. Moreover, the pixel data of the pixel located at the lower-right corner of the block image BG14 stored in the second input buffer 112 is stored in the pixel register 153 (see FIG. 30).

Figure 31:
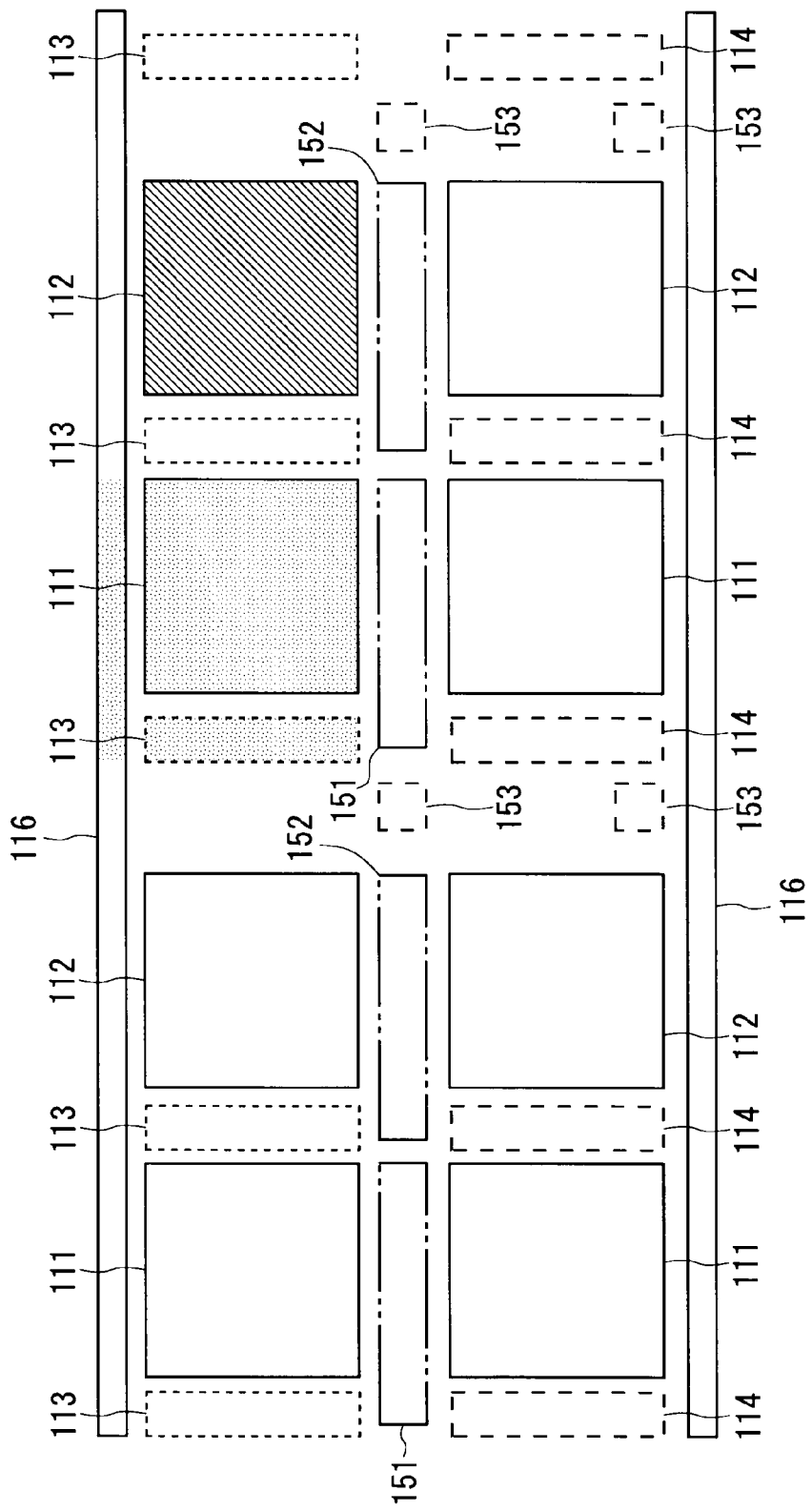
FIG. 31 is a diagram for explaining the operation of the resizing section according to the second preferred embodiment.

When the next block image BG16 is inputted, the block image BG16 is stored in the second input buffer 112, and additionally the resizing process is performed on the block image BG15 stored in the first input buffer 111 (see FIG. 31). The resizing process on the block image BG15 is performed with reference to the block image BG15 stored in the first input buffer 111, the unit column data stored in the first column resistor 113, and the continuous line data stored in the line memory 116. Thus, a reference region to be subjected to the resizing process on the block image BG15 is a region hatched with a sand pattern shown in FIG. 31.

After the resizing process on the block image BG15 is completed, the rightmost unit column data of the block image BG15 stored in the first input buffer 111 is stored in the first column resistor 113, and the lowermost unit line data of the block image BG15 is stored right-aligned in the first line register 151. Also, pixel data of the pixel located at the lower-right corner of the block image BG15 stored in the first input buffer 111 is stored left-aligned in the second line register 152 (see FIG. 32).

Figure 32:
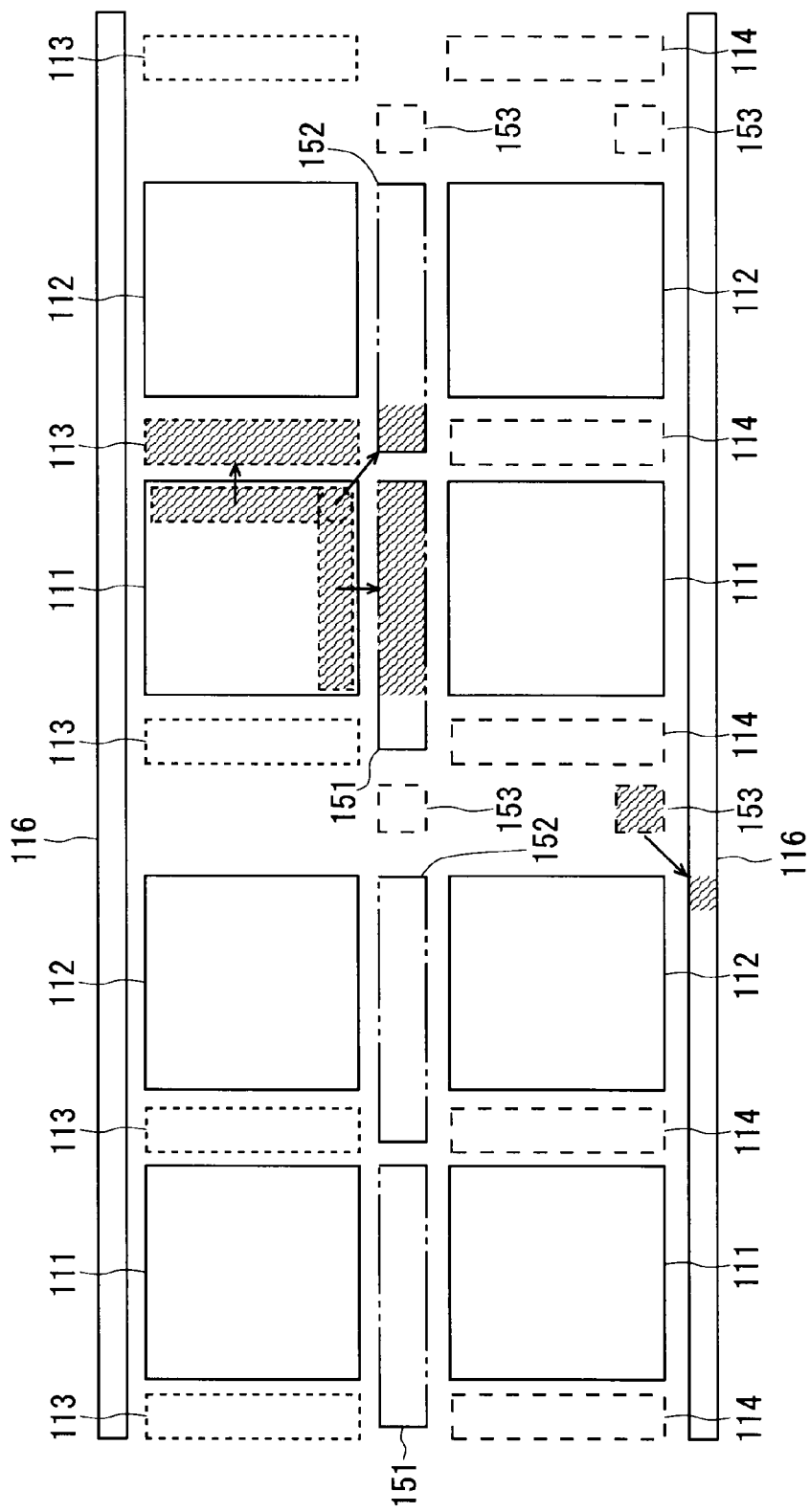
FIG. 32 is a diagram for explaining the operation of the resizing section according to the second preferred embodiment.

At a timing of completion of the resizing process on the block image BG15, the pixel data of the pixel located at the lower-right corner of the block image BG14 stored in the pixel register 153 is stored in the line memory 116 (see FIG. 32).

Figure 33:
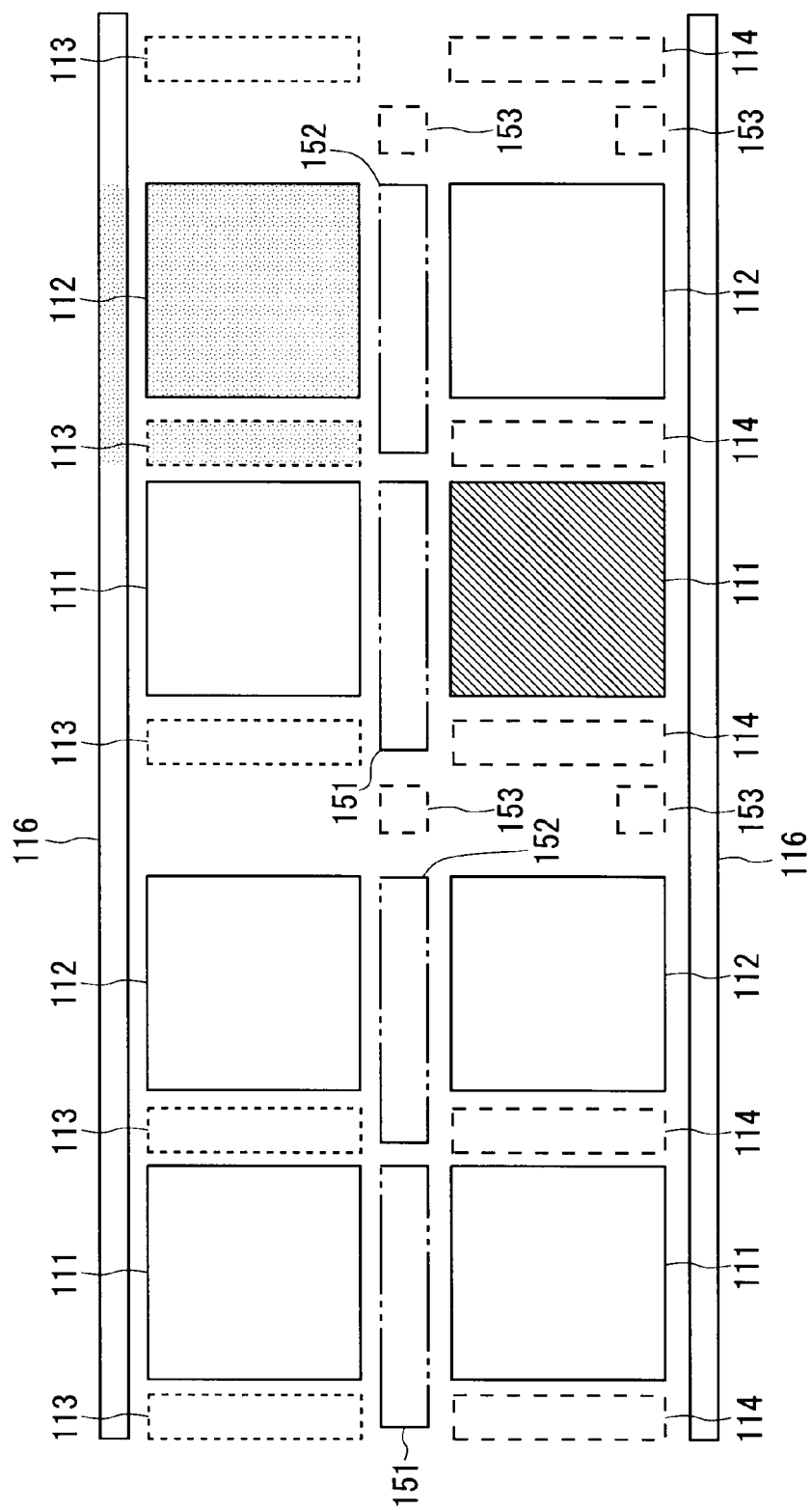
FIG. 33 is a diagram for explaining the operation of the resizing section according to the second preferred embodiment.

When the next block image BG17 is inputted, the block image BG17 is stored in the first input buffer 111, and additionally the resizing process is performed on the block image BG16 stored in the second input buffer 112 (see FIG. 33). The resizing process on the block image BG16 is performed with reference to the block image BG16 stored in the second input buffer 112, the unit column data stored in the first column resistor 113, and the continuous line data stored in the line memory 116. Thus, a reference region to be subjected to the resizing process on the block image BG16 is a region hatched with a sand pattern shown in FIG. 33.

When the block image BG17 as shown in FIG. 33 is inputted, the same operation as the operation performed upon the input of the block image BG13 (FIG. 25) is performed. Subsequent to the operation shown in FIG. 33, each operation shown in FIGS. 26 to 33 is repeatedly performed.

In the resizing section 10B described above, even if the block images are inputted in the JPEG-XR input sequence, pixels included in the reference region obtained by extending the input block image can be read out as the reference pixels used for the resizing process during the resizing process. Therefore, even pixel data of interpolating pixels existing at the boundary between block images can be accurately calculated.

3. <Third Preferred Embodiment>

Figure 34:
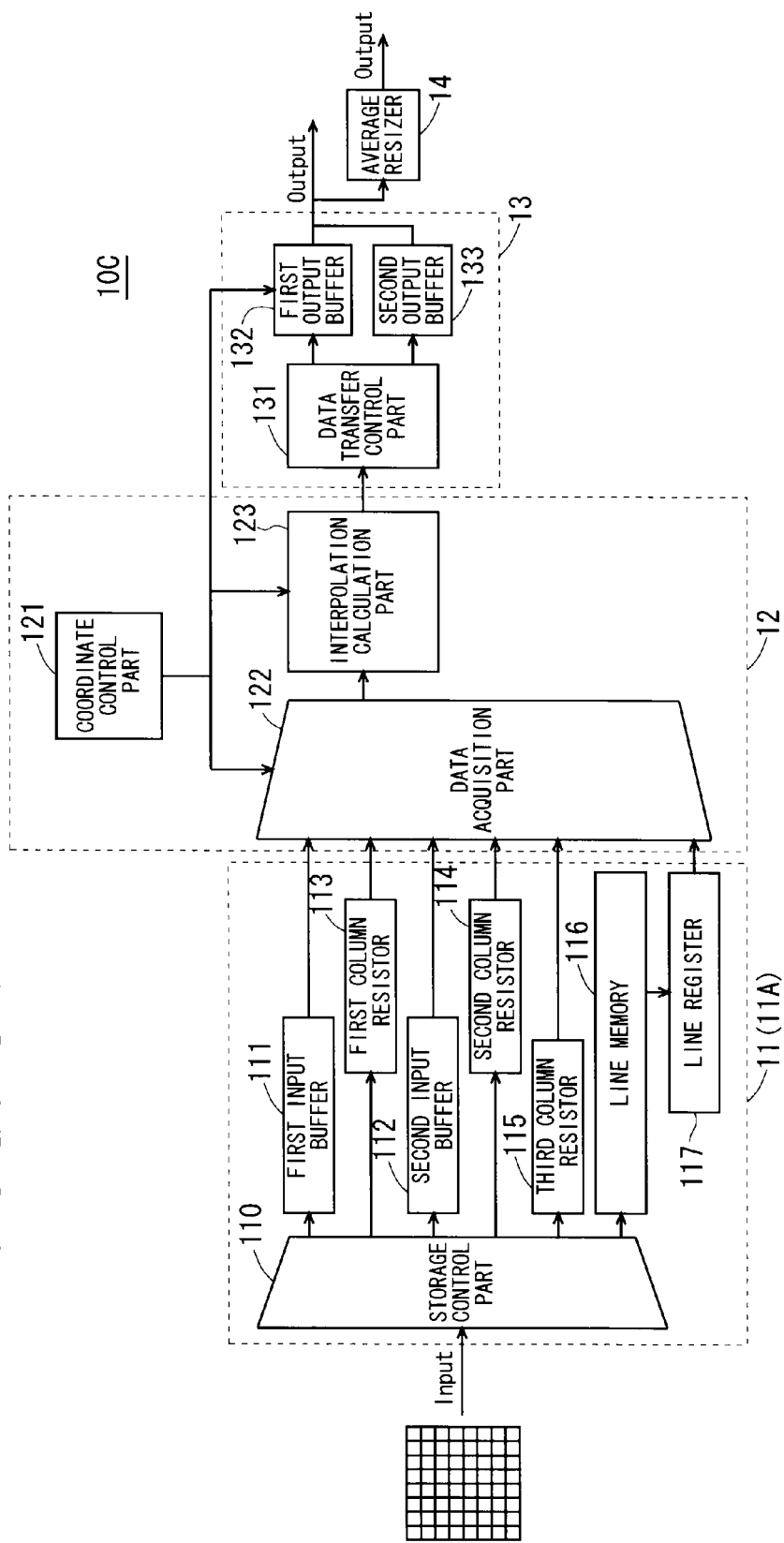
FIG. 34 is a diagram showing a detailed configuration of a resizing section according to a third preferred embodiment.
Figure 35:
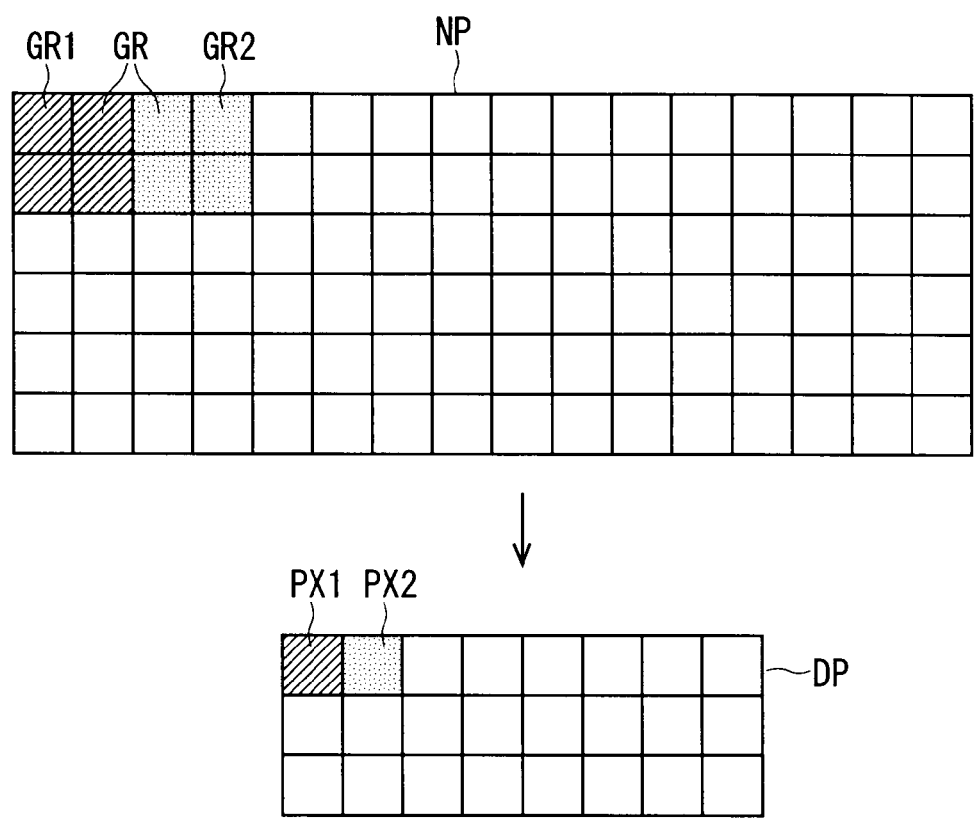
FIG. 35 is a diagram showing an image inputted to an average resizer and an image outputted from the average resizer.
Figure 36:
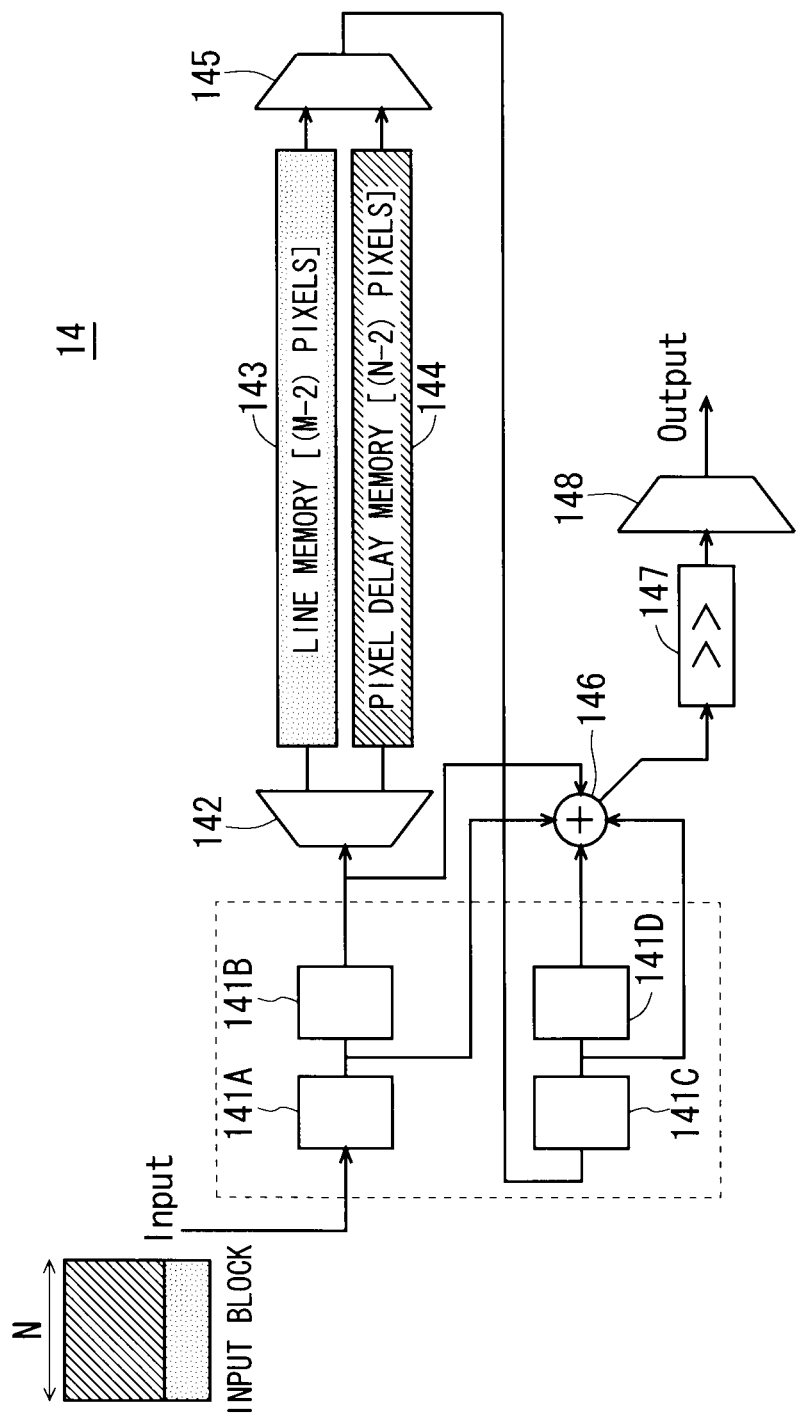
FIG. 36 is a diagram showing an internal configuration of the average resizer.
Figure 37:
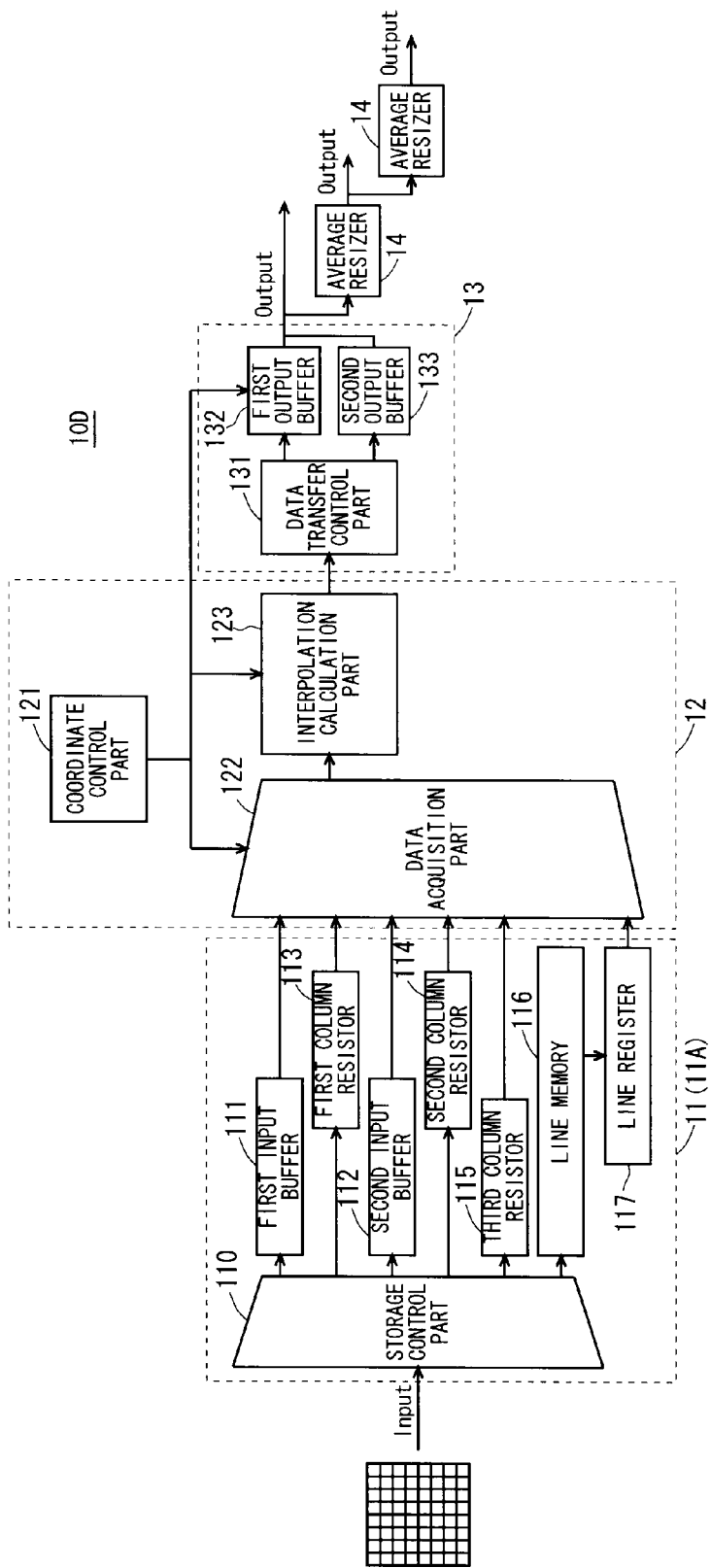
FIG. 37 is a diagram showing a detailed configuration of a resizing section.

Next, a third preferred embodiment will be described. A resizing section 10C according to the third preferred embodiment further includes an average resizer provided after the output processing section 13. In the configuration of the resizing section 10C, the parts in common with the resizing section 10A according to the first preferred embodiment are denoted by the same corresponding reference numerals, and descriptions thereof are omitted. FIG. 34 is a diagram showing a detailed configuration of the resizing section 10C. FIG. 35 is a diagram showing an image NP inputted to the average resizer 14 and an image DP outputted from the average resizer 14. FIG. 36 is a diagram showing an internal configuration of the average resizer 14. FIG. 37 is a diagram showing a detailed configuration of a resizing section 10D.

As shown in FIG. 34, the resizing section 10C according to the third preferred embodiment further includes an average resizer (average reduction means) 14 provided after the output processing section 13.

The average resizer 14 has a function of generating a reduced image by performing an average resizing process (average reduction process) so that an average of pixel data of each pixel included in a rectangular pixel region made up of the plurality of pixels is obtained as pixel data corresponding to one pixel.

More specifically, in a case where the average resizer 14 is operable to perform the average resizing process so that an average of pixel data of pixels included in a pixel region made up of 2×2 pixels is obtained as pixel data corresponding to one pixel, the average resizer 14 reduces an image inputted thereto by ½, and outputs a resulting image. For example, in a case where a block image NP having 6×16 pixels is inputted as shown in FIG. 35, the average resizer 14 performs the average resizing process on the block image NP for each pixel region GR having 2×2 pixels, and outputs a block image DP having 3×8 pixels. More specifically, pixel data of a pixel PX1 of the block image DP is calculated from a pixel region GR1 having 2×2 pixels of the input block image NP, and pixel data of a pixel PX2 of the block image DP is calculated from a pixel region GR2 of the block image NP.

Such an average resizer 14 is configured as shown in FIG. 36, for example.

As shown in FIG. 36, the average resizer 14 includes four registers 141A to 141D, a first selector 142, a line memory 143, a pixel delay memory 144, a second selector 145, an adder 146, a shift processing section 147, and a third selector 148.

To the average resizer 14, the block image NP outputted from the output processing section 13 is inputted on a pixel basis in the raster order. The pixel data inputted to the average resizer 14 are sequentially stored in the two registers 141A and 141B, and then inputted to the first selector 142.

The first selector 142 determines a transfer destination of the pixel data inputted to the first selector 142, and transfers the pixel data to the line memory 143 or the pixel delay memory 144. To be more specific, the first selector 142 normally outputs the pixel data inputted thereto to the pixel delay memory 144. If the pixel data inputted to the first selector 142 is pixel data included in both an odd-numbered line pixel data of the block image NP and the lowermost line pixel data of the block image NP, the first selector 142 exceptionally outputs the pixel data to the line memory 143.

Here, when the number of horizontal pixels included in the entire image to be inputted to the average resizer 14 is defined as "M", the line memory 116 has a capacity to store pixel data of (M−2) pixels. When the number of horizontal pixels included in the block image NP is defined as "N", the pixel delay memory 144 has a capacity to store pixel data of (N−2) pixels.

Accordingly, as a result of the above-described operation of the first selector 142, (N−2) pixel data is stored in the pixel delay memory 144, and (M−2) pixel data is stored in the line memory 143.

The second selector 145 acquires pixel data from either one of the line memory 143 and the pixel delay memory 144, and outputs the pixel data to the register 141C. The second selector 145 acquires, from the line memory 143 or the pixel delay memory 144, pixel data of a pixel of the entire image located immediately above the pixel being inputted to the register 141A. Then, the second selector 145 outputs the acquired pixel data to the register 141C.

In the average resizer 14, the storing of the pixel data in the registers 141 A to 141D, the line memory 143, and the pixel delay memory 144 is performed in synchronization with the input of the pixel data to the average resizer 14. Consequently, when the pixel data in the register 141C is stored in the register 141D, pixel data of all the pixels included in a 2×2 pixel region are completed in the four registers 141A to 141D, respectively.

The adder 146 sums the pixel data outputted from each of the registers 141A to 141 D, and outputs resulting data to the shift processing section 147.

The shift processing section 147 performs a 2-bit shift process on the pixel data (summed pixel data) obtained as a result of the summing. Thereby, the shift processing section 147 calculates an average pixel data obtained by averaging the four pixel data.

The third selector 148 outputs the average pixel data inputted from the shift processing section 147, on a 2×2-pixel-region basis. That is, while a pixel included in an even-numbered line of the entire image is being inputted, the third selector 148 outputs the average pixel data once per input of 2 pixels.

In the average resizer 14 described above, the average resizing process can be sequentially performed on the image that is inputted on a block basis. Therefore, the reduced image can be efficiently generated.

In the average resizer 14 described above, the number of pixels in the pixel region, in other words, the number of pixels to be subjected to computation processing in one average computation, is set to be a power of two. This allows an average computation process to be implemented by a summing process and a shift process (shift computation). As a result, the amount of the average computation process can be reduced. Since the pixel region is a region made up of pixels to be subjected to the computation process, the pixel region can also be recognized as a computation-object pixel region.

If the average resizers 14 are connected in multiple stages in the resizing section 10D as shown in FIG. 37, a plurality of average resized images can be simultaneously generated while the computation amount required in a reduction process is reduced.

This preferred embodiment illustrates a case where the average resizer 14 is connected after the output processing section 13 of the resizing section 1 OA according to the first preferred embodiment. However, the average resizer 14 may be connected after the output processing section 13 of the resizing section 10B according to the second preferred embodiment.

<4. Modification>

While some preferred embodiments have been described, the present invention is not limited to the above-described embodiments.

For example, a plurality of sets of the interpolation calculation section 123 and the output processing section 13 may be provided in the resizing section. FIG. 38 is a diagram showing a configuration of a resizing section 10E according to a modification.

More specifically, as shown in FIG. 38, the resizing section 10E includes two sets of the interpolation calculation section 123 and the output processing section 13.

In the resizing section 10E, the interpolation calculation is performed with an interval of interpolating pixels varying among the sets, and resized images are generated concurrently. This allows a plurality of kinds of resized images to be simultaneously generated based on a single input image.

Although in the preferred embodiments, the block image inputted to the resizing section 10 has a size of 8×8 pixels, this is not limitative. The size of the input block image may be any size such as 4×4 pixels, 16×16 pixels, and 32×32 pixels.

The resizing section 10A of the first preferred embodiment and the resizing section 10B of the second preferred embodiment may share a common member so that they can be implemented as a single resizing section. Such a single resizing section is operable in both cases where the sequence of input of block images is the raster order and where the sequence of input of block images is the JPEG-XR input sequence. Therefore, the resizing process can be performed in accordance with an encoding method adopted by the image encoding section of the image processing apparatus 1.

The configuration of the average resizer 14 of the third preferred embodiment is not limited to that shown in FIG. 36. FIG. 39 is a diagram showing a modification of the internal configuration of the average resizer 14 (14A).

To be specific, as shown in FIG. 39, an average resizer 14A includes three registers 141A to 141C, a first adder 161, the first selector 142, a line memory 162, a pixel delay memory 163, the second selector 145, a second adder 164, the shift processing section 147, and the third selector 148.

In the average resizer 14A, the first adder 161 sums pixel data of pixels continuous with each other in the horizontal direction, and then pixel data (horizontal pixel data) obtained as a result of the horizontal summing is stored in the line memory 162 or the pixel delay memory 163. The horizontal pixel data outputted from the first adder 161 and horizontal pixel data delayed for predetermined pixels by the line memory 162 or the pixel delay memory 163 are summed in the vertical direction by the second adder 164. Thereby, summed pixel data for the four pixels included in the computation-object pixel region having 2×2 pixels is acquired.

In the average resizer 14A configured in this manner, the capacity of the line memory 162 can be set to be a capacity to store pixel data of (M/2−1) pixels, and the capacity of the pixel delay memory 163 can be set to be a capacity to store pixel data of (N/2−1) pixels. Thus, the memory capacity can be reduced as compared with the average resizer 14 of the third preferred embodiment.

In the first preferred embodiment and the second preferred embodiment described above, the image reduction process is illustrated as an example of the resizing process performed by the resizing section 10. However, this is not limitative, and an image enlargement process may be performed as the resizing process. In a case of the enlargement process, the interpolation calculation is performed with a smaller interval (interpolation interval) of interpolating pixels.

In the preferred embodiments described above, the bilinear interpolation method is adopted as the interpolation method to perform the interpolation calculation. However, this is not limitative, and, for example, a bi-cubic interpolation method or a nearest neighbor interpolation method may also be adopted. Since a reference pixel necessary for calculation differs depending on which interpolation method is adopted, pixels to be stored in each storage section serving as the second storage means are changed appropriately.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
a first storage section and a second storage section;
a storage control processor configured to sequentially acquire block images that do not overlap with each other obtained as a result of dividing an input image and storing an acquired block image as a target block image in said first storage section, while storing separately from the stored block image, in said second storage section, image data of a region of said target block image abutting un-inputted block images in said input image, as image data of an abuttal region;
a resizing processor configured to implement a resizing process for changing the size of said target block image by performing a horizontal and vertical interpolation calculation using image data of said target block image stored in said first storage section and image data of an abuttal region previously stored in said second storage section;
an output processor configured to sequentially output an image obtained as a result of said resizing process, on a specific region basis, said specific region including a plurality of block images to which said resizing process is performed;
a first average reduction processor configured to generate a reduced image by performing a reduction process in which an average of pixel values of pixels included in a rectangular region in an image of said specific region is obtained as a pixel value corresponding to one pixel;
a third storage section; and
a fourth storage section, wherein
the storage control processor is configured to
store a rightmost column data of said target block image, as the image data of the abuttal region, in said second storage region,
store a lowermost unit line data of said target block image in said third storage section, and
store pixel data of a pixel located at a lower-right corner of said target block image in said fourth storage section; and
said resizing processor is configured to implement the resizing process for changing the size of said target block image by performing the horizontal and vertical interpolation calculation using the image data of said target block image and the data previously stored in said second storage section, said third storage section, and said fourth storage section.

2. The image processing apparatus according to claim 1, wherein
the number of pixels included in said rectangular region is a power of two.

3. The image processing apparatus according to claim 2, further comprising
a second average reduction processor connected after said first average reduction processor, configured to reduce said reduced image by performing a reduction process in which an average of pixel values of pixels included in a rectangular region in said reduced image is obtained as a pixel value corresponding to one pixel.

4. The image processing apparatus according to claim 1, further comprising
a second average reduction processor connected after said first average reduction processor, configured to reduce said reduced image by performing a reduction process in which an average of pixel values of pixels included in a rectangular region in said reduced image is obtained as a pixel value corresponding to one pixel.

5. The image processing apparatus according to claim 1, wherein the image data of the abuttal region previously stored in the storage section and used to implement the resizing process for changing the size of the target block image is image data of a region of a block image abutting the target block image and acquired by the storage control processor prior to the target block image.

6. The image processing apparatus according to claim 1, wherein
said image processing apparatus comprises a plurality of said resizing processor,
said horizontal and vertical interpolation calculation is performed with an interval of interpolating pixels varying among the plurality of resizing processors, and
the interval of interpolating pixels is a ratio of a number of pixels of the input image with respect to a number of pixels of the resized image.

7. The image processing apparatus according to claim 6, wherein said horizontal and vertical interpolation calculation is performed on said resizing processor simultaneously with a horizontal and vertical interpolation calculation performed on another of the plurality of resizing processors.

8. A method for operating an image processing apparatus, comprising:
sequentially acquiring block images that do not overlap with each other obtained as a result of dividing an input image;
storing a sequentially-acquired block image as a target block image in a first storage section, while storing separately from the stored block image, in a second storage section, image data of a region of said target block image abutting un-inputted block images in said input image, as image data of an abuttal region;
implementing a resizing process for changing the size of said target block image by performing a horizontal and vertical interpolation calculation using image data of said target block image stored in said first storage section and image data of an abuttal region previously stored in said second storage section;
sequentially outputting an image obtained as a result of said resizing process, on a specific region basis, said specific region including a plurality of block images to which said resizing process is performed;
generating a reduced image by performing a reduction process in which an average of pixel values of pixels included in a rectangular region in an image of said specific region is obtained as a pixel value corresponding to one pixel;
storing a rightmost column data of said target block image, as the image data of the abuttal region, in said second storage region;
storing a lowermost unit line data of said target block image in a third storage section; and
storing pixel data of a pixel located at a lower-right corner of said target block image in a fourth storage section; and
implementing the resizing process for changing the size of said target block image by performing the horizontal and vertical interpolation calculation using the image data of said target block image and the data previously stored in said second storage section, said third storage section, and said fourth storage section.

9. The method according to claim 8, wherein the image data of the abuttal region previously stored in the storage section and used to implement the resizing process for changing the size of the target block image is image data of a region of a block image abutting the target block image and acquired prior to the target block image.

10. The method according to claim 8, wherein
said horizontal and vertical interpolation calculation is performed via a plurality of processors of the image processing apparatus with an interval of interpolating pixels varying among the plurality of processors, and
the interval of interpolating pixels is a ratio of a number of pixels of the input image with respect to a number of pixels of the resized image.

11. The method according to claim 10, wherein said horizontal and vertical interpolation calculation is performed on one processor of the plurality of processors simultaneously with a horizontal and vertical interpolation performed on another processor of the plurality of processors.

* * * * *